US009512314B2

(12) United States Patent
Satou et al.

(10) Patent No.: US 9,512,314 B2
(45) Date of Patent: *Dec. 6, 2016

(54) POLYETHER POLYAMIDE COMPOSITION

(71) Applicant: Mitsubishi Gas Chemical Company, Inc., Tokyo (JP)

(72) Inventors: Kazuya Satou, Kanagawa (JP); Tomonori Katou, Kanagawa (JP); Jun Mitadera, Kanagawa (JP); Mayumi Takeo, Kanagawa (JP); Nobuhide Tsunaka, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,007

(22) PCT Filed: Aug. 12, 2013

(86) PCT No.: PCT/JP2013/071839
§ 371 (c)(1),
(2) Date: Feb. 11, 2015

(87) PCT Pub. No.: WO2014/027651
PCT Pub. Date: Feb. 20, 2014

(65) Prior Publication Data
US 2015/0210852 A1 Jul. 30, 2015

(30) Foreign Application Priority Data

Aug. 14, 2012 (JP) .................................. 2012-179744
Aug. 14, 2012 (JP) .................................. 2012-179745

(51) Int. Cl.
*C08L 77/06* (2006.01)
*C08G 69/40* (2006.01)
*C08L 63/00* (2006.01)
*C08G 69/26* (2006.01)
*B01F 3/08* (2006.01)
*B01F 15/06* (2006.01)
*B29B 7/00* (2006.01)
*C08K 5/29* (2006.01)
*B29K 63/00* (2006.01)
*B29K 79/00* (2006.01)

(52) U.S. Cl.
CPC .............. *C08L 77/06* (2013.01); *B01F 3/0811* (2013.01); *B01F 15/06* (2013.01); *B29B 7/005* (2013.01); *C08G 69/265* (2013.01); *C08G 69/40* (2013.01); *C08L 63/00* (2013.01); *B01F 2015/062* (2013.01); *B01F 2215/0049* (2013.01); *B29K 2063/00* (2013.01); *B29K 2079/085* (2013.01); *C08K 5/29* (2013.01); *C08L 2201/10* (2013.01)

(58) Field of Classification Search
None
See application file for complete search history.

(56) References Cited

U.S. PATENT DOCUMENTS

| 3,946,089 | A | * | 3/1976 | Furukawa | ............... B32B 27/06 264/210.7 |
|---|---|---|---|---|---|
| 4,218,351 | A | | 8/1980 | Rasmussen | |
| 4,345,052 | A | | 8/1982 | Mumcu et al. | |
| 4,429,081 | A | | 1/1984 | Mumcu et al. | |
| 5,128,441 | A | | 7/1992 | Speranza et al. | |
| 5,744,570 | A | | 4/1998 | Gebben | |
| 5,882,793 | A | | 3/1999 | Shida et al. | |
| 5,906,891 | A | | 5/1999 | Shida et al. | |
| 6,451,890 | B1 | | 9/2002 | Imashiro et al. | |
| 8,822,630 | B2 | | 9/2014 | Oda et al. | |
| 9,139,693 | B2 | | 9/2015 | Takeo et al. | |
| 9,206,288 | B2 | | 12/2015 | Takeo et al. | |
| 2003/0144462 | A1 | | 7/2003 | Okushita et al. | |
| 2006/0189784 | A1 | | 8/2006 | Monsheimer et al. | |
| 2007/0172670 | A1 | | 7/2007 | Mutsuda et al. | |
| 2007/0244211 | A1 | * | 10/2007 | Phelan | ................... C08G 69/40 522/70 |
| 2008/0290553 | A1 | | 11/2008 | Durand et al. | |
| 2009/0269533 | A1 | | 10/2009 | Sato | |
| 2009/0274913 | A1 | | 11/2009 | Okushita et al. | |
| 2010/0004406 | A1 | * | 1/2010 | Sato | ....................... B32B 27/34 525/432 |
| 2011/0014833 | A1 | * | 1/2011 | Hagiwara | ............... C08G 69/40 442/59 |
| 2011/0060079 | A1 | | 3/2011 | Kim et al. | |
| 2013/0078402 | A1 | | 3/2013 | Mitadera et al. | |
| 2013/0324695 | A1 | | 12/2013 | Takeo et al. | |
| 2013/0324696 | A1 | | 12/2013 | Takeo et al. | |
| 2015/0045532 | A1 | | 2/2015 | Takeo et al. | |
| 2015/0218315 | A1 | | 8/2015 | Takeo et al. | |

(Continued)

FOREIGN PATENT DOCUMENTS

CN  101472975 A  7/2009
CN  103403065 A  11/2013

(Continued)

OTHER PUBLICATIONS

International Search Report date of mailing Oct. 8, 2013 for PCT/JP2013/071839 and English translation of the same (4 pages).

(Continued)

*Primary Examiner* — Ana Woodward
(74) *Attorney, Agent, or Firm* — Fitch, Even, Tabin & Flannery LLP

(57) ABSTRACT

Provided is a polyether polyamide composition including 100 parts by mass of a polyether polyamide in which a diamine constituent unit thereof is derived from a specified polyether diamine compound and a xylylenediamine, and a dicarboxylic acid constituent unit thereof is derived from an α,ω-linear aliphatic dicarboxylic acid having from 4 to 20 carbon atoms, having blended therein from 0.01 to 15 parts by mass of at least one molecular chain extender selected from a carbodiimide compound and a compound containing two or more epoxy groups in a molecule thereof.

28 Claims, No Drawings

(56) References Cited

U.S. PATENT DOCUMENTS

| | | |
|---|---|---|
| 2015/0218344 A1 | 8/2015 | Takeo et al. |
| 2015/0218348 A1 | 8/2015 | Tsunaka et al. |
| 2015/0218731 A1 | 8/2015 | Mitadera et al. |

FOREIGN PATENT DOCUMENTS

| | | |
|---|---|---|
| EP | 0 313 861 A1 | 5/1989 |
| EP | 2 036 939 A1 | 3/2009 |
| GB | 1 490 453 A | 11/1977 |
| JP | S49-110744 A | 10/1974 |
| JP | S51-63860 B | 6/1976 |
| JP | S56-65026 A | 6/1981 |
| JP | 60-158221 A | 8/1985 |
| JP | H01-193320 A | 8/1989 |
| JP | 402011647 * | 1/1990 |
| JP | H03-237131 A | 10/1991 |
| JP | H06-335522 A | 12/1994 |
| JP | 09-118750 A | 5/1997 |
| JP | H09-241924 A | 9/1997 |
| JP | H11-93320 A | 4/1999 |
| JP | 11-315419 A | 11/1999 |
| JP | 11-343408 | 12/1999 |
| JP | 2004-010768 A | 1/2004 |
| JP | 2004-161964 A | 6/2004 |
| JP | 2004-346274 A | 12/2004 |
| JP | 2006-028314 A | 2/2006 |
| JP | 2008-086874 A | 4/2008 |
| JP | 2008-133455 | 6/2008 |
| JP | 4527461 B2 | 8/2010 |
| JP | 2011-026762 A | 2/2011 |
| JP | 2014-037642 A | 2/2014 |
| TW | 200604281 A | 2/2006 |
| TW | 200936643 A | 9/2009 |
| WO | 2006/001136 A1 | 1/2006 |
| WO | 2007/145324 A1 | 12/2007 |
| WO | 2009/057805 A1 | 5/2009 |
| WO | 2010/047315 A1 | 4/2010 |
| WO | 2012/005204 A1 | 1/2012 |
| WO | 2012/090797 A1 | 7/2012 |
| WO | 2012/111635 A1 | 8/2012 |
| WO | 2012/111636 A1 | 8/2012 |
| WO | 2013/105607 A1 | 7/2013 |
| WO | 2013/133145 A1 | 9/2013 |

OTHER PUBLICATIONS

Huntsman Corporation, Technical Bulletin, Jeffamine ED-2003 Polyetheramine, 2008 (2 pages).
Huntsman Corporation, Technical Bulletin, Jeffamine ED-900 Polyetheramine, 2008 (2 pages).
International Search Report dated May 15, 2012 for PCT/JP2012/053312 (2 pages).
International Search Report dated Oct. 8, 2013 for PCT/JP2013/071837 and English translation (4 pages).
International Search Report dated Oct. 8, 2013 for PCT/JP2013/071838 and English translation (4 pages).
International Search Report dated Oct. 15, 2013 for PCT/JP2013/071836 and English translation (4 pages).
International Search Report dated Nov. 12, 2013 for PCT/JP2013/071835 and English translation (4 pages).
Keith Marchildon, Polyamides—Still Strong After Seventy Years, Macromolecular Reaction Engineering, 2011, vol. 5, pp. 22-54.
Huntsman Corporation, Technical Bulletin, The Jeffamine Polyoxyalkyleneamines, 2002 (6 pages).
European Patent Office Extended European Search Report issued Feb. 29, 2016 in corresponding European Patent Application No. 13879575.2 (8 pages).
European Patent Office Extended European Search Report issued Mar. 22, 2016 in corresponding European Patent Application No. 13879360.9 (5 pages).
Huntsman Corporation, Technical Bulletin for XTJ-542, Polyetherdiamine, 2011 (2 pages).

* cited by examiner

POLYETHER POLYAMIDE COMPOSITION

CROSS-REFERENCE TO RELATED APPLICATIONS

This application is a U.S. national phase application filed under 35 U.S.C. §371 of International Application PCT/JP2013/071839, filed on Aug. 12, 2013, designating the United States, which claims priority from Japanese Application Number 2012-179744, filed Aug. 14, 2012, and Japanese Application Number 2012-179745 filed Aug. 14, 2012, which are hereby incorporated herein by reference in their entirety.

TECHNICAL FIELD

The present invention relates to a polyether polyamide composition, and in detail, the invention relates to a polyether polyamide composition which is suitable for materials of automobile parts, electric parts, electronic parts, and the like.

BACKGROUND ART

Polyamide resins are a material which is used for wide applications including fibers, engineering plastics, and the like; however, it is known that the polyamide resins are easily hydrolyzed in an acidic medium.

In order to improve hydrolysis resistance or the like of polyamide resins, a polyamide resin composition in which a polyamide resin is blended with an aliphatic carbodiimide compound is known (Patent Document 1). Though such a polyamide resin composition has such properties that it is excellent in terms of hydrolysis resistance, there is a concern that it is insufficient in terms of flexibility and impact resistance.

Then, as a thermoplastic resin composition which is excellent in terms of barrier properties and mechanical properties such as strength, impact resistance, elongation, etc., a thermoplastic resin composition containing a polyamide resin (A) which is composed of a polyamide resin (a-1) in which 70% by mole or more of a diamine constituent unit thereof is derived from m-xylylenediamine, and 70% by mole or more of a dicarboxylic acid constituent unit is derived from an α,ω-linear aliphatic dicarboxylic acid having from 4 to 20 carbon atoms and nylon 11 and/or nylon 12 (a-2); and a carbodiimide compound (B) having two or more carbodiimide groups in a molecule thereof is known (Patent Document 2).

CITATION LIST

Patent Literature

Patent Document 1: JP-A-11-343408
Patent Document 2: JP-A-2008-133455

SUMMARY OF INVENTION

Technical Problem

However, in the thermoplastic resin composition disclosed in Patent Document 2, since two kinds of polyamide resins having a different refractive index from each other are blended, there may be the case where cloudiness is caused regardless of a degree of crystallization, and hence, for an application in which a certain degree or more of transparency is required, a more enhancement in the transparency is desired.

A technical problem to be solved by the present invention is to provide a polyamide-based resin composition having hydrolysis resistance and transparency and also having excellent mechanical properties such as flexibility, tensile elongation at break, etc.

Solution to Problem

The present invention provides the following polyether polyamide compositions and molded articles.

<1> A polyether polyamide composition comprising 100 parts by mass of a polyether polyamide (A1) in which a diamine constituent unit thereof is derived from a polyether diamine compound (a1-1) represented by the following general formula (1) and a xylylenediamine (a-2), and a dicarboxylic acid constituent unit thereof is derived from an α,ω-linear aliphatic dicarboxylic acid having from 4 to 20 carbon atoms, having blended therein from 0.01 to 15 parts by mass of at least one molecular chain extender (B) selected from a carbodiimide compound and a compound containing two or more epoxy groups in a molecule thereof:

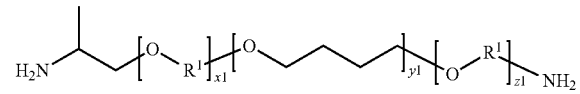

(1)

wherein $(x1+z1)$ is from 1 to 30; $y1$ is from 1 to 50; and $R^1$ represents a propylene group.

<2> A method for producing the polyether polyamide composition as set forth above in <1>, which comprises blending 100 parts by mass of the polyether polyamide (A1) with from 0.01 to 15 parts by mass of the molecular chain extender (B) and melt kneading the blend.

<3> A molded article comprising the polyether polyamide composition as set forth above in <1>.

<4> A polyether polyamide composition comprising 100 parts by mass of a polyether polyamide (A2) in which a diamine constituent unit thereof is derived from a polyether diamine compound (a2-1) represented by the following general formula (2) and a xylylenediamine (a-2), and a dicarboxylic acid constituent unit thereof is derived from an α,ω-linear aliphatic dicarboxylic acid having from 4 to 20 carbon atoms, having blended therein from 0.01 to 15 parts by mass of at least one molecular chain extender (B) selected from a carbodiimide compound and a compound containing two or more epoxy groups in a molecule thereof:

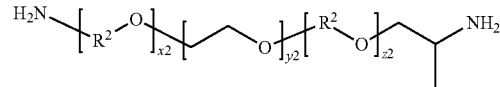

(2)

wherein $(x2+z2)$ is from 1 to 60; $y2$ is from 1 to 50; and $R^2$ represents a propylene group.

<5> A method for producing the polyether polyamide composition as set forth above in <4>, which comprises blending 100 parts by mass of the polyether polyamide (A2) with from 0.01 to 15 parts by mass of the molecular chain extender (B) and melt kneading the blend.

<6> A molded article comprising the polyether polyamide composition as set forth above in <4>.

Advantageous Effects of Invention

The polyether polyamide composition of the present invention has hydrolysis resistance and transparency and also has excellent mechanical properties such as flexibility, tensile elongation at break, etc. In addition, the polyether polyamide composition of the present invention is also favorable in terms of melt moldability, toughness, and heat resistance.

DESCRIPTION OF EMBODIMENTS

[Polyether Polyamide Composition]

As a first invention, the polyether polyamide composition of the present invention comprises 100 parts by mass of a polyether polyamide (A1) in which a diamine constituent unit thereof is derived from a polyether diamine compound (a1-1) represented by the following general formula (1) and a xylylenediamine (a-2), and a dicarboxylic acid constituent unit thereof is derived from an α,ω-linear aliphatic dicarboxylic acid having from 4 to 20 carbon atoms, having blended therein from 0.01 to 15 parts by mass of at least one molecular chain extender (B) selected from a carbodiimide compound and a compound containing two or more epoxy groups in a molecule thereof.

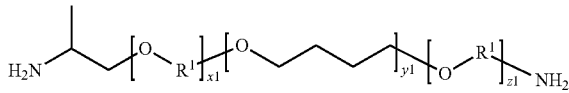

(1)

In the formula, $(x1+z1)$ is from 1 to 30; y1 is from 1 to 50; and $R^1$ represents a propylene group.

In addition, as a second invention, the polyether polyamide composition of the present invention comprises 100 parts by mass of a polyether polyamide (A2) in which a diamine constituent unit thereof is derived from a polyether diamine compound (a2-1) represented by the following general formula (2) and a xylylenediamine (a-2), and a dicarboxylic acid constituent unit thereof is derived from an α,ω-linear aliphatic dicarboxylic acid having from 4 to 20 carbon atoms, having blended therein from 0.01 to 15 parts by mass of at least one molecular chain extender (B) selected from a carbodiimide compound and a compound containing two or more epoxy groups in a molecule thereof.

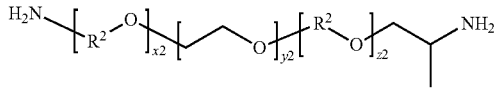

(2)

In the formula, $(x2+z2)$ is from 1 to 60; y2 is from 1 to 50; and $R^2$ represents a propylene group.

<Polyether Polyamides (A1) and (A2)>

The polyether polyamide (A1) is one in which a diamine constituent unit thereof is derived from a polyether diamine compound (a1-1) represented by the foregoing general formula (1) and a xylylenediamine (a-2), and a dicarboxylic acid constituent unit thereof is derived from an α,ω-linear aliphatic dicarboxylic acid having from 4 to 20 carbon atoms. In addition, the polyether polyamide (A2) is one in which a diamine constituent unit thereof is derived from a polyether diamine compound (a2-1) represented by the foregoing general formula (2) and a xylylenediamine (a-2), and a dicarboxylic acid constituent unit thereof is derived from an α,ω-linear aliphatic dicarboxylic acid having from 4 to 20 carbon atoms. By using each of the polyether polyamides (A1) and (A2), it is possible to produce a polyether polyamide composition having excellent mechanical properties such as flexibility, tensile elongation at break, etc.

(Diamine Constituent Unit)

The diamine constituent unit that constitutes the polyether polyamide (A1) is derived from a polyether diamine compound (a1-1) represented by the foregoing formula (1) and a xylylenediamine (a-2). In addition, the diamine constituent unit that constitutes the polyether polyamide (A2) is derived from a polyether diamine compound (a2-1) represented by the foregoing formula (2) and a xylylenediamine (a-2).

[Polyether Diamine Compound (a1-1)]

The diamine constituent unit that constitutes the polyether polyamide (A1) contains a constituent unit derived from a polyether diamine compound (a1-1) represented by the foregoing general formula (1). In the foregoing general formula (1), (x1+z1) is from 1 to 30, preferably from 2 to 25, more preferably from 2 to 20, and still more preferably from 2 to 15. In addition, y1 is from 1 to 50, preferably from 1 to 40, more preferably from 1 to 30, and still more preferably from 1 to 20. In the case where the values of x1, y1, and z1 are larger than the foregoing ranges, the compatibility with an oligomer or polymer composed of a xylylenediamine and a dicarboxylic acid, which is formed on the way of a reaction of melt polymerization, becomes low, so that the polymerization reaction proceeds hardly.

In addition, in the foregoing general formula (1), all of $R^1$s represent a propylene group. A structure of the oxypropylene group represented by $-OR^1-$ may be any of $-OCH_2CH_2CH_2-$, $-OCH(CH_3)CH_2-$, and $-OCH_2CH(CH_3)-$.

A number average molecular weight of the polyether diamine compound (a1-1) is preferably from 204 to 5,000, more preferably from 250 to 4,000, still more preferably from 300 to 3,000, yet still more preferably from 400 to 2,000, and even yet still more preferably from 500 to 1,800. So long as the number average molecular weight of the polyether diamine compound falls within the foregoing range, a polymer that reveals flexibility can be obtained.

[Polyether Diamine Compound (a2-1)]

The diamine constituent unit that constitutes the polyether polyamide (A2) contains a constituent unit derived from a polyether diamine compound (a2-1) represented by the foregoing general formula (2). In the foregoing general formula (2), (x2+z2) is from 1 to 60, preferably from 2 to 40, more preferably from 2 to 30, and still more preferably from 2 to 20. In addition, y2 is from 1 to 50, preferably from 1 to 40, more preferably from 1 to 30, and still more preferably from 1 to 20. In the case where the values of x2, y2, and z2 are larger than the foregoing ranges, the compatibility with an oligomer or polymer composed of a xylylenediamine and a dicarboxylic acid, which is formed on the way of a reaction of melt polymerization, becomes low, so that the polymerization reaction proceeds hardly.

In addition, in the foregoing general formula (2), all of $R^2$s represent a propylene group. A structure of the oxypropylene group represented by —$OR^2$— may be any of —$OCH_2CH_2CH_2$—, —$OCH(CH_3)CH_2$—, and —$OCH_2CH(CH_3)$—.

A number average molecular weight of the polyether diamine compound (a2-1) is preferably from 180 to 5,700, more preferably from 200 to 4,000, still more preferably from 300 to 3,000, yet still more preferably from 300 to 2,000, and even yet still more preferably from 300 to 1,500. So long as the number average molecular weight of the polyether diamine compound falls within the foregoing range, a polymer that reveals flexibility and absorption and desorption properties of moisture can be obtained.

[Xylylenediamine (a-2)]

The diamine constituent unit that constitutes the polyether polyamide (A1) or (A2) contains a constituent unit derived from a xylylenediamine (a-2). The xylylenediamine (a-2) is preferably m-xylylenediamine, p-xylylenediamine, or a mixture thereof, and more preferably m-xylylenediamine or a mixture of m-xylylenediamine and p-xylylenediamine.

In the case where the xylylenediamine (a-2) is derived from m-xylylenediamine, the resulting polyether polyamide is excellent in terms of flexibility, crystallinity, melt moldability, molding processability, and toughness.

In the case where the xylylenediamine (a-2) is derived from a mixture of m-xylylenediamine and p-xylylenediamine, the resulting polyether polyamide is excellent in terms of flexibility, crystallinity, melt moldability, molding processability, and toughness and furthermore, exhibits high heat resistance and high elastic modulus.

In the case where a mixture of m-xylylenediamine and p-xylylenediamine is used as the xylylenediamine (a-2), a proportion of the p-xylylenediamine relative to a total amount of m-xylylenediamine and p-xylylenediamine is preferably 90% by mole or less, more preferably from 1 to 80% by mole, and still more preferably from 5 to 70% by mole. So long as the proportion of p-xylylenediamine falls within the foregoing range, a melting point of the resulting polyether polyamide is not close to a decomposition temperature of the polyether polyamide, and hence, such is preferable.

A proportion of the constituent unit derived from the xylylenediamine (a-2) in the diamine constituent unit, namely a proportion of the xylylenediamine (a-2) relative to a total amount of the polyether diamine compound (a1-1) or (a2-1) and the xylylenediamine (a-2), both of which constitute the diamine constituent unit, is preferably from 50 to 99.8% by mole, more preferably from 50 to 99.5% by mole, and still more preferably from 50 to 99% by mole. So long as the proportion of the constituent unit derived from the xylylenediamine (a-2) in the diamine constituent unit falls within the foregoing range, the resulting polyether polyamide is excellent in terms of melt moldability and furthermore, is excellent in terms of mechanical physical properties such as strength, elastic modulus, etc.

As described previously, though the diamine constituent unit that constitutes the polyether polyamide (A1) or (A2) is derived from the polyether diamine compound (a1-1) represented by the foregoing general formula (1) and the xylylenediamine (a-2), or the polyether diamine compound (a2-1) represented by the foregoing general formula (2) and the xylylenediamine (a-2), so long as the effects of the present invention are not hindered, a constituent unit derived from other diamine compound may be contained.

As the diamine compound which may constitute a diamine constituent unit other than the polyether diamine compound (a1-1) and the xylylenediamine (a-2), and the polyether diamine compound (a2-1) and the xylylenediamine (a-2), though there can be exemplified aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine, etc.; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, etc.; diamines having an aromatic ring, such as bis(4-aminophenyl) ether, p-phenylenediamine, bis(aminomethyl)naphthalene, etc.; and the like, the diamine compound is not limited to these compounds.

(Dicarboxylic Acid Constituent Unit)

The dicarboxylic acid constituent unit that constitutes the polyether polyamide (A1) or (A2) is derived from an α,ω-linear aliphatic dicarboxylic acid having from 4 to 20 carbon atoms. As the α,ω-linear aliphatic dicarboxylic acid having from 4 to 20 carbon atoms, though there can be exemplified succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, and the like, at least one member selected from adipic acid and sebacic acid is preferably used from the viewpoints of crystallinity and high elasticity. These dicarboxylic acids may be used solely or in combination of two or more kinds thereof.

As described previously, though the dicarboxylic acid constituent unit that constitutes the polyether polyamide (A1) or (A2) is derived from the α,ω-linear aliphatic dicarboxylic acid having from 4 to 20 carbon atoms, so long as the effects of the present invention are not hindered, a constituent unit derived from other dicarboxylic acid may be contained.

As the dicarboxylic acid which may constitute the dicarboxylic acid constituent unit other than the α,ω-linear aliphatic dicarboxylic acid having from 4 to 20 carbon atoms, though there can be exemplified aliphatic dicarboxylic acids such as oxalic acid, malonic acid, etc.; aromatic dicarboxylic acids such as terephthalic acid, isophthalic acid, 2,6-naphthalenedicarboxylic acid, etc.; and the like, the dicarboxylic acid is not limited to these compounds.

In the case where a mixture of an α,ω-linear aliphatic dicarboxylic acid having from 4 to 20 carbon atoms and isophthalic acid is used as the dicarboxylic acid component, the heat resistance and molding processability of the polyether polyamide (A1) or (A2) can be enhanced. A molar ratio of the α,ω-linear aliphatic dicarboxylic acid having from 4 to 20 carbon atoms and isophthalic acid ((α,ω-linear aliphatic dicarboxylic acid having from 4 to 20 carbon atoms)/(isophthalic acid)) is preferably from 50/50 to 99/1, and more preferably from 70/30 to 95/5.

(Physical Properties of Polyether Polyamides (A1) and (A2))

When the polyether polyamide (A1) or (A2) contains, as a hard segment, a highly crystalline polyamide block formed of the xylylenediamine (a-2) and the α,ω-linear aliphatic dicarboxylic acid having from 4 to 20 carbon atoms and, as a soft segment, a polyether block derived from the polyether diamine compound (a1-1) or (a2-1), it is excellent in terms of melt moldability and molding processability. Furthermore, the resulting polyether polyamide is excellent in terms of toughness, flexibility, crystallinity, heat resistance, and the like.

A relative viscosity of the polyether polyamide (A1) or (A2) is preferably in the range of from 1.1 to 3.0, more preferably in the range of from 1.1 to 2.9, and still more preferably in the range of from 1.1 to 2.8 from the viewpoints of moldability and melt mixing properties with other resins. The relative viscosity is measured by a method described in the Examples.

A melting point of the polyether polyamide (A1) is preferably in the range of from 170 to 270° C., more preferably in the range of from 175 to 270° C., and still more preferably in the range of from 180 to 270° C. from the viewpoint of heat resistance. In addition, a melting point of the polyether polyamide (A2) is preferably in the range of from 170 to 270° C., more preferably in the range of from 175 to 270° C., still more preferably in the range of from 180 to 270° C., and yet still more preferably in the range of 180 to 260° C. from the viewpoint of heat resistance. The melting point is measured by a method described in the Examples.

A rate of tensile elongation at break of the polyether polyamide (A1) (measurement temperature: 23° C., humidity: 50% RH) is preferably 50% or more, more preferably 100% or more, still more preferably 200% or more, yet still more preferably 250% or more, and even yet still more preferably 300% or more from the viewpoint of flexibility. In addition, a rate of tensile elongation at break of the polyether polyamide (A2) (measurement temperature: 23° C., humidity: 50% RH) is preferably 100% or more, more preferably 200% or more, still more preferably 250% or more, and yet still more preferably 300% or more from the viewpoint of flexibility.

A tensile modulus of the polyether polyamide (A1) (measurement temperature: 23° C., humidity: 50% RH) is preferably 200 MPa or more, more preferably 300 MPa or more, still more preferably 400 MPa or more, yet still more preferably 500 MPa or more, and even yet still more preferably 1,000 MPa or more from the viewpoints of flexibility and mechanical strength. In addition, a tensile modulus of the polyether polyamide (A2) (measurement temperature: 23° C., humidity: 50% RH) is preferably 100 MPa or more, more preferably 200 MPa or more, still more preferably 300 MPa or more, yet still more preferably 400 MPa or more, and even yet still more preferably 500 MPa or more from the viewpoints of flexibility and mechanical strength.

(Production of Polyether Polyamides (A1) and (A2))

The production of the polyether polyamide (A1) or (A2) is not particularly limited but can be performed by an arbitrary method under an arbitrary polymerization condition.

The polyether polyamide (A1) or (A2) can be, for example, produced by a method in which a salt composed of the diamine component (the diamine including the polyether diamine compound (a1-1) and the xylylenediamine (a-2), and the like, or the diamine including the polyether diamine compound (a2-1) and the xylylenediamine (a-2), and the like) and the dicarboxylic acid component (the dicarboxylic acid including the α,ω-linear aliphatic dicarboxylic acid having from 4 to 20 carbon atoms and the like) is subjected to temperature rise in a pressurized state in the presence of water, and polymerization is performed in a molten state while removing the added water and condensed water.

In addition, the polyether polyamide (A1) or (A2) can also be produced by a method in which the diamine component (the diamine including the polyether diamine compound (a1-1) and the xylylenediamine (a-2), and the like, or the diamine including the polyether diamine compound (a2-1) and the xylylenediamine (a-2), and the like) is added directly to the dicarboxylic acid component (the dicarboxylic acid including the α,ω-linear aliphatic dicarboxylic acid having from 4 to 20 carbon atoms and the like) in a molten state, and polycondensation is performed under atmospheric pressure. In that case, in order to keep the reaction system in a uniform liquid state, the diamine component is continuously added to the dicarboxylic acid component, and during this period, the polycondensation is advanced while subjecting the reaction system to temperature rise such that the reaction temperature does not fall below the melting point of the formed oligoamide or polyamide.

A molar ratio of the diamine component (the diamine including the polyether diamine compound (a1-1) and the xylylenediamine (a-2), and the like, or the diamine including the polyether diamine compound (a2-1) and the xylylenediamine (a-2), and the like) and the dicarboxylic acid component (the dicarboxylic acid including the α,ω-linear aliphatic dicarboxylic acid having from 4 to 20 carbon atoms and the like) ((diamine component)/(dicarboxylic acid component)) is preferably in the range of from 0.9 to 1.1, more preferably in the range of from 0.93 to 1.07, still more preferably in the range of from 0.95 to 1.05, and yet still more preferably in the range of from 0.97 to 1.02. When the molar ratio falls within the foregoing range, an increase of the molecular weight is easily advanced.

A polymerization temperature is preferably from 150 to 300° C., more preferably from 160 to 280° C., and still more preferably from 170 to 270° C. So long as the polymerization temperature falls within the foregoing temperature range, the polymerization reaction is rapidly advanced. In addition, since the monomers or the oligomer or polymer, etc. on the way of the polymerization hardly causes thermal decomposition, properties of the resulting polyether polyamide become favorable.

A polymerization time is generally from 1 to 5 hours after starting to add dropwise the diamine component. When the polymerization time is allowed to fall within the foregoing range, the molecular weight of the polyether polyamide (A1) or (A2) can be sufficiently increased, and furthermore, coloration of the resulting polyether polyamide can be suppressed.

In addition, the polyether polyamide (A1) or (A2) may also be produced by previously charging the polyether diamine compound (a1-1) or (a2-1) as the diamine component in a reaction tank together with the dicarboxylic acid component and heating them to form a molten mixture [Step (1)]; and adding to the resulting molten mixture the diamine component other than the above-described polyether diamine compound (a1-1) or (a2-1), including the xylylenediamine (a-2) and the like [Step (2)].

In that case, in order to keep the reaction system in a uniform liquid state, the diamine component other than the polyether diamine compound (a1-1) or (a2-1) is continuously added to the dicarboxylic acid component, and during that period, the polycondensation is advanced while subjecting the reaction system to temperature rise such that the reaction temperature does not fall below the melting point of the formed oligoamide or polyamide.

Here, while the above-described [Step (1)] and [Step (2)] are described, in the description, each of the polyether polyamides (A1) and (A2) may be sometimes referred to as "polyamide (A)", and each of the polyether diamine compounds (a1-1) and (a2-1) may be sometimes referred to as "polyether diamine compound (a-1)".

[Step (1)]

Step (1) is a step of mixing the above-described polyether diamine compound (a-1) and the above-described α,ω-linear aliphatic dicarboxylic acid and heating them to form a molten mixture.

By going through Step (1), the resulting polyether polyamide is less in odor and coloration, and a resin having a more excellent rate of tensile elongation at break can be formed. It may be presumed that this is caused due to the fact that by going through Step (1), the polyether diamine compound (a-1) and the α,ω-linear aliphatic dicarboxylic acid compound are uniformly melted and mixed, and therefore, in a synthesis process of a polyether polyamide, before the temperature in the reaction vessel reaches a temperature at which the decomposition of the polyether diamine compound (a-1) proceeds, the polyether diamine compound (a-1) is (poly)condensed with the α,ω-linear aliphatic dicarboxylic acid compound and stabilized. That is, it may be considered that by going through Step (1), in the synthesis process of a polyether polyamide, deterioration of the polyether diamine compound (a-1) by thermal history or the like is prevented and efficiently incorporated into the polyether polyamide, and as a result, a decomposition product derived from the polyether diamine compound (a-1) is hardly formed.

It is possible to perform evaluation on what degree of the polyether diamine compound (a-1) is stabilized in the reaction system, by determining an incorporation rate. The incorporation rate is also dependent upon the kind of the α,ω-linear aliphatic dicarboxylic acid compound, and the more increased the carbon number of the straight chain of the α,ω-linear aliphatic dicarboxylic acid compound, the higher the incorporation rate of the polyether diamine compound (a-1) is; however, by going through Step (1), the incorporation rate becomes higher.

The incorporation rate of the above-described polyether diamine compound (a-1) can be determined by the following method.

(1) 0.2 g of the resulting polyether polyamide (A) is dissolved in 2 mL of hexafluoroisopropanol (HFIP).

(2) The solution obtained in (1) is added dropwise to 100 mL of methanol to perform reprecipitation.

(3) A reprecipitate obtained in (2) is filtered with a membrane filter having an opening of 10 μm.

(4) A residue on the filter as obtained in (3) is dissolved in heavy HFIP (manufactured by Sigma-Aldrich) and analyzed by means of $^1$H-NMR (AV400M, manufactured by Bruker BioSpin K.K.), and a copolymerization ratio (a) between the polyether diamine compound (a-1) and the xylylenediamine (a-2) of the residue on the filter is calculated. The copolymerization ratio is calculated from a ratio of a spectral peak area assigned to the xylylenediamine (a-2) and a spectral peak area assigned to the polyether diamine compound (a-1).

(5) The incorporation rate of the polyether diamine compound (a-1) is calculated according to the following equation.

Incorporation rate of polyester diamine compound $(a\text{-}1) = a/b \times 100 (\%)$ a: Copolymerization ratio of the constituent unit derived from the polyether diamine compound (a-1) of the residue on the filter relative to all of the diamine constituent units, as calculated in (4)

b: Copolymerization ratio of the constituent unit derived from the polyether diamine compound (a-1) relative to all of the diamine constituent units, as calculated from the charge amount at the time of polymerization First of all, in Step (1), the polyether diamine compound (a-1) and the α,ω-linear aliphatic dicarboxylic acid compound are previously charged in a reaction vessel, and the polyether diamine compound (a-1) in a molten state and the α,ω-linear aliphatic dicarboxylic acid compound in a molten state are mixed.

In order to render both the polyether diamine compound (a-1) and the α,ω-linear aliphatic dicarboxylic acid compound in a molten state, (i) The solid α,ω-linear aliphatic dicarboxylic acid compound and the liquid or solid polyether diamine compound (a-1) may be charged in a reaction vessel and then melted by heating to the melting point of the α,ω-linear aliphatic dicarboxylic acid compound or higher;

(ii) The melted α,ω-linear aliphatic dicarboxylic acid compound may be charged in a reaction vessel having the liquid or solid polyether diamine compound (a-1) charged therein;

(iii) The liquid or solid polyether diamine compound (a-1) may be charged in a reaction vessel having the α,ω-linear aliphatic dicarboxylic acid compound in a molten state charged therein; or (iv) A mixture prepared by previously mixing the melted polyether diamine compound (a-1) and the melted α,ω-linear aliphatic dicarboxylic acid compound may be charged in a reaction vessel.

In the foregoing (i) to (iv), on the occasion of charging the polyether diamine compound (a-1) and/or the α,ω-linear aliphatic dicarboxylic acid compound in a reaction vessel, the compound or compounds may be dissolved or dispersed in an appropriate solvent. On that occasion, examples of the solvent include water and the like.

In addition, from the viewpoint of producing a polyether polyamide with less coloration, in charging the polyether diamine compound (a-1) and the α,ω-linear aliphatic dicarboxylic acid compound in a reaction vessel, it is preferable to thoroughly purge the inside of the reaction vessel with an inert gas.

In the case of the foregoing (i), it is preferable to purge the inside of the reaction vessel with an inert gas before melting; in the case of the foregoing (ii) or (iii), it is preferable to purge the inside of the reaction vessel before charging the melted α,ω-linear aliphatic dicarboxylic acid compound; and in the case of the foregoing (iv), it is preferable to purge the inside of the reaction vessel before charging the above-described mixture.

Subsequently, in Step (1), the above-described mixture of the polyether diamine compound (a-1) in a molten state and the α,ω-linear aliphatic dicarboxylic acid compound in a molten state is heated.

A heating temperature on the occasion of heating the above-described mixture is preferably the melting point of the α,ω-linear aliphatic dicarboxylic acid compound or higher; more preferably in the range of from the melting point of the α,ω-linear aliphatic dicarboxylic acid compound to (the melting point+40° C.); and still more preferably in the range of from the melting point of the α,ω-linear aliphatic dicarboxylic acid compound to (the melting point+30° C.).

In addition, the heating temperature at the time of finishing Step (1) is preferably from the melting point of the α,ω-linear aliphatic dicarboxylic acid compound to (the melting point+50° C.). When the heating temperature is the melting point of the α,ω-linear aliphatic dicarboxylic acid compound or higher, the mixed state of the polyether diamine compound (a-1) and the α,ω-linear aliphatic dicarboxylic acid compound becomes uniform, so that the effects of the present invention can be sufficiently revealed. In addition, when the heating temperature is not higher than (the melting point of α,ω-linear aliphatic dicarboxylic acid compound+50° C.), there is no concern that the thermal decomposition of the polyether diamine compound (a-1) and the α,ω-linear aliphatic dicarboxylic acid compound proceeds.

Incidentally, the melting point of the α,ω-linear aliphatic dicarboxylic acid compound can be measured by means of differential scanning calorimetry (DSC) or the like.

A heating time in Step (1) is generally from about 15 to 120 minutes. By allowing the heating time to fall within the foregoing range, the mixed state of the polyether diamine compound (a-1) and the α,ω-linear aliphatic dicarboxylic acid compound can be made thoroughly uniform, and there is no concern that the thermal decomposition proceeds.

In Step (1), the molten mixture in which the polyether diamine compound (a-1) in a molten state and the α,ω-linear aliphatic dicarboxylic acid compound in a molten state are uniformly mixed as described above is obtained. In addition, meanwhile, in Step (1), it is preferable that from 30 to 100% by mole of an amino group in the whole of the charged polyether diamine compound (a-1) is (poly)condensed with the α,ω-linear aliphatic dicarboxylic acid compound to form an oligomer or polymer. From this fact, the above-described molten mixture obtained in Step (1) may further contain the above-described melted oligomer or polymer.

In Step (1), a degree of (poly)condensation between the polyether diamine compound (a-1) and the α,ω-linear aliphatic dicarboxylic acid compound as described above varies with a combination of the polyether diamine compound (a-1) and the α,ω-linear aliphatic dicarboxylic acid compound, a mixing ratio thereof, a temperature of the reaction vessel on the occasion of mixing, or a mixing time; however, before Step (2) of adding the diamine component other than the polyether diamine compound (a-1), it is preferable that 30% by mole or more of the amino group of the whole of the charged polyether diamine compound (a-1) is (poly)condensed with the α,ω-linear aliphatic dicarboxylic acid compound, it is more preferable that 50% by mole or more of the amino group of the whole of the charged polyether diamine compound (a-1) is (poly)condensed with the α,ω-linear aliphatic dicarboxylic acid compound, and it is still more preferable that 70% by mole or more of the amino group of the whole of the charged polyether diamine compound (a-1) is (poly)condensed with the α,ω-linear aliphatic dicarboxylic acid compound.

A rate of reaction of the amino group of the whole of the polyether diamine compound can be calculated according to the following equation.

Rate of reaction of amino group=(1−[NH$_2$ in Step (1)]/[NH$_2$ in (a-1)])×100

[NH$_2$ in (a-1)]: Terminal amino group concentration calculated on the occasion of assuming that the whole of the polyether diamine compound (a-1) and the α,ω-linear aliphatic dicarboxylic acid compound as charged are in an uncreated state [NH$_2$ in Step (1)]: Terminal amino group concentration of the mixture in Step (1)

In addition, in Step (1), on the occasion of charging the polyether diamine compound (a-1) and the α,ω-linear aliphatic dicarboxylic acid compound in the reaction vessel, a phosphorus atom-containing compound and an alkali metal compound as described later may be added.

[Step (2)]

Step (2) is a step of adding a diamine component other than the above-described polyether diamine compound (a-1), including the xylylene diamine (a-2) and the like (hereinafter sometimes abbreviated as "xylylenediamine (a-2), etc.") to the molten mixture obtained in Step (1).

In Step (2), a temperature in the reaction vessel on the occasion of adding the xylylenediamine (a-2), etc. is preferably a temperature of the melting point of the formed polyether amide oligomer or higher and up to (the melting point+30° C.). When the temperature in the reaction vessel on the occasion of adding the xylylenediamine (a-2), etc. is a temperature of the melting point of the polyether amide oligomer composed of the molten mixture of the polyether diamine compound (a-1) and the α,ω-linear aliphatic dicarboxylic acid compound and the xylylenediamine (a-2), etc. or higher and up to (the melting point+30° C.), there is no possibility that the reaction mixture is solidified in the reaction vessel, and there is less possibility that the reaction mixture is deteriorated, and hence, such is preferable.

Though the above-described addition method is not particularly limited, it is preferable to continuously add dropwise the xylylenediamine (a-2), etc. while controlling the temperature in the reaction vessel within the foregoing temperature range, and it is more preferable to continuously raise the temperature in the reaction vessel with an increase of the amount of dropwise addition of the xylylenediamine (a-2), etc.

In addition, it is preferable that at a point of time of completion of addition of the whole amount of the diamine component including the xylylenediamine (a-2), etc., the temperature in the reaction vessel is from the melting point of the produced polyether polyamide to (the melting point+30° C.). When at a point of time of completion of addition of the xylylenediamine (a-2), etc., the temperature in the reaction vessel is a temperature of the melting point of the resulting polyether amide (A) or higher and up to (the melting point+30° C.), there is no possibility that the reaction mixture is solidified in the reaction vessel, and there is less possibility that the reaction mixture is deteriorated, and hence, such is preferable.

Incidentally, the melting point of the polyether amide oligomer or polyether polyamide as referred to herein can be confirmed by means of DSC or the like with respect to a material obtained by previously mixing the polyether diamine compound (a-1), the xylylenediamine (a-2), etc., and the dicarboxylic acid compound in a prescribed molar ratio and melting and mixing them in a nitrogen gas stream for at least about one hour under a heating condition to such an extent that the mixture is melted.

During this period, it is preferable that the inside of the reaction vessel is purged with nitrogen. In addition, during this period, it is preferable that the system in the reaction vessel is mixed using a stirring blade, thereby rendering the inside of the reaction vessel in a uniform fluidized state.

An addition rate of the xylylenediamine (a-2), etc. is chosen in such a manner that the reaction system is held in a uniform molten state while taking into consideration heat of formation of an amidation reaction, a quantity of heat to be consumed for distillation of condensation formed water, a quantity of heat to be fed into the reaction mixture from a heating medium through a reaction vessel wall, a structure of a portion at which the condensation formed water and the raw material compounds are separated from each other, and the like.

Though a time required for addition of the xylylenediamine (a-2), etc. varies with a scale of the reaction vessel, it is generally in the range of from 0.5 to 5 hours, and more preferably in the range of from 1 to 3 hours. When the time falls within the foregoing range, not only the solidification of the polyether amide oligomer and the polyether polyamide (A) formed in the reaction vessel can be suppressed, but the coloration due to thermal history of the reaction system can be suppressed.

During addition of the xylylenediamine (a-2), etc., condensed water formed with the progress of reaction is distilled outside the reaction system. Incidentally, the raw materials such as the scattered diamine compound and dicarboxylic acid compound, etc. are separated from condensed water and returned into the reaction vessel; and in this respect, it is possible to control an amount thereof, and the amount can be controlled by, for example, controlling a temperature of a reflux column to an optimum range or controlling a filler of a packing column, such as so-called Raschig ring, Lessing ring, saddle, etc. to appropriate shape and filling amount. For separation of the raw materials from condensed water, a partial condenser is suitable, and it is preferable to distill off condensed water through a total condenser.

In the above-described Step (2), a pressure in the inside of the reaction vessel is preferably from 0.1 to 0.6 MPa, and more preferably from 0.15 to 0.5 MPa. When the pressure in the inside of the reaction vessel is 0.1 MPa or more, scattering of the unreacted xylylenediamine (a-2), etc. and dicarboxylic acid compound outside the system together with condensed water can be suppressed. For the purpose of preventing scattering of the unreacted xylylenediamine (a-2), etc. and dicarboxylic acid compound outside the system, the scattering can be suppressed by increasing the pressure in the inside of the reaction vessel; however, it can be thoroughly suppressed at a pressure of 0.6 MPa or less. When the pressure in the reaction vessel is more than 0.6 MPa, more energy is required for distilling condensed water outside the reaction system, for example, because there is a concern that the boiling point of the condensed water becomes high, so that it is necessary to allow a high-temperature heating medium to pass by a partial condenser, and hence, such is not preferable.

In the case of applying a pressure, it may be performed by using an inert gas such as nitrogen, etc., or it may be performed by using a steam of condensed water formed during the reaction. In the case where the pressure has been applied, after completion of addition of the xylylenediamine (a-2), etc., the pressure is reduced until it reaches atmospheric pressure.

[Step (3)]

After completion of Step (2), though the polycondensation reaction may be finished, Step (3) of further continuing the polycondensation reaction may be performed at atmospheric pressure or negative pressure for a fixed period of time.

In the case of further continuing the polycondensation reaction at negative pressure, it is preferable to perform pressure reduction such that the pressure of the reaction system is finally 0.08 MPa or less. Though the time of from completion of addition of the xylylenediamine (a-2), etc. to start of the pressure reduction is not particularly limited, it is preferable to start the pressure reduction within 30 minutes after completion of addition. As for a pressure reduction rate, a rate such that the unreacted xylylenediamine (a-2), etc. is not distilled outside the system together with water during the pressure reduction is chosen, and for example, it is chosen from the range of from 0.1 to 1 MPa/hr. When the pressure reduction rate is made slow, not only a time required for the production increases, but a lot of time is required for the pressure reduction, so that there is a concern that heat deterioration of the resulting polyether polyamide (A) is caused; and hence, such is not preferable.

A temperature of the reaction vessel in Step (3) is preferably a temperature at which the resulting polyether polyamide (A) is not solidified, namely a temperature in the range of from the melting point of the polyether polyamide (A) to (the melting point+30° C.). Incidentally, the melting point of the polyether polyamide as referred to herein can be confirmed by means of DSC or the like.

A polycondensation reaction time in Step (3) is generally 120 minutes or less. When the polymerization time is allowed to fall within the foregoing range, the molecular weight of the polyether polyamides (A) can be sufficiently increased, and furthermore, coloration of the resulting polymer can be suppressed.

After completion of the polycondensation reaction, a method of taking out the polyether polyamide (A) from the reaction vessel is not particularly limited, and a known technique can be adopted; however, from the viewpoints of productivity and sequent handling properties, a technique in which while extracting a strand through a strand die heated at a temperature of from the melting point of the polyether polyamide (A) to (the melting point+50° C.), the strand of the molten resin is cooled in a water tank and then cut by a pelletizer to obtain pellets, or so-called hot cutting or underwater cutting, or the like is preferable. On that occasion, for the purpose of increasing or stabilizing a discharge rate of the polyester polyamide (A) from the strand die, or the like, the inside of the reaction vessel may be pressurized. In the case of pressurization, in order to suppress deterioration of the polyether polyamide (A), it is preferable to use an inert gas.

It is preferable that the polyether polyamide (A1) or (A2) is produced by a melt polycondensation (melt polymerization) method by addition of a phosphorus atom-containing compound. The melt polycondensation method is preferably a method in which the diamine component is added dropwise to the dicarboxylic acid component having been melted at atmospheric pressure, and the mixture is polymerized in a molten state while removing condensed water.

In the polycondensation system of the polyether polyamide (A1) or (A2), a phosphorus atom-containing compound can be added within the range where properties thereof are not hindered. Examples of the phosphorus atom-containing compound which can be added include dimethylphosphinic acid, phenylmethylphosphinic acid, hypophosphorous acid, sodium hypophosphite, potassium hypophosphite, lithium hypophosphite, ethyl hypophosphite, phenylphosphonous acid, sodium phenylphosphonoate, potassium phenylphosphonoate, lithium phenylphosphonoate, ethyl phenylphosphonoate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, pyrrophosphorous acid, and the like; and of these, in particular, hypophosphorous acid metal salts such as sodium hypophosphite, potassium hypophosphite, lithium hypophosphite, etc. are preferably used because they are high in terms of an effect for promoting the amidation reaction and also excellent in terms of a coloration preventing effect, with sodium hypophosphite being especially preferable. The phosphorus atom-containing compound which can be used in the present invention is not limited to these compounds. The addition amount of the phosphorus atom-containing compound which is added in the polycondensation system is preferably from 1 to 1,000 ppm, more preferably from 5 to 1,000 ppm, and still more preferably from 10 to 1,000 ppm as converted into a phosphorus atom concentration in the polyether polyamide (A1) or (A2) from the viewpoints of favorable appearance and molding processability.

In addition, it is preferable to add an alkali metal compound in combination with the phosphorus atom-containing compound in the polycondensation system of the polyether polyamide (A1) or (A2). In order to prevent the coloration of the polymer during the polycondensation, it is necessary to allow a sufficient amount of the phosphorus atom-containing compound to exist; however, under certain circumstances, there is a concern that gelation of the polymer is caused, and therefore, in order to also adjust an amidation reaction rate, it is preferable to allow an alkali metal compound to coexist. As the alkali metal compound, alkali metal hydroxides and alkali metal acetates are preferable. Examples of the alkali metal compound which can be used in the present invention include lithium hydroxide, sodium hydroxide, potassium hydroxide, rubidium hydroxide, cesium hydroxide, lithium acetate, sodium acetate, potassium acetate, rubidium acetate, cesium acetate, and the like; however, the alkali metal compound can be used without being limited to these compounds. In the case of adding the alkali metal compound in the polycondensation system, a value obtained by dividing the molar number of the compound by the molar number of the phosphorus atom-containing compound is regulated to preferably from 0.5 to 1, more preferably from 0.55 to 0.95, and still more preferably from 0.6 to 0.9. When the subject value falls within the foregoing range, an effect for appropriately suppressing the promotion of the amidation reaction of the phosphorus atom-containing compound is brought; and therefore, the occurrence of the matter that the polycondensation reaction rate is lowered due to excessive suppression of the reaction, so that thermal history of the polymer increases, thereby causing an increase of gelation of the polymer can be avoided.

A sulfur atom concentration of the polyether polyamide (A1) or (A2) is preferably from 1 to 200 ppm, more preferably from 10 to 150 ppm, and still more preferably from 20 to 100 ppm. When the sulfur atom concentration falls within the foregoing range, not only an increase of yellowness (YI value) of the polyether polyamide at the time of production can be suppressed, but an increase of the YI value on the occasion of melt molding the polyether polyamide composition of the present invention can be suppressed, thereby making it possible to suppress the YI value of the resulting molded article at a low level.

Furthermore, in the case of using sebacic acid as the dicarboxylic acid, its sulfur atom concentration is preferably from 1 to 500 ppm, more preferably from 1 to 200 ppm, still more preferably from 10 to 150 ppm, and especially preferably from 20 to 100 ppm. When the sulfur atom concentration falls within the foregoing range, an increase of the YI value on the occasion of polymerizing the polyether polyamide and on the occasion of melt molding the polyether polyamide composition of the present invention can be suppressed, thereby making it possible to suppress the YI value of the resulting molded article at a low level.

Similarly, in the case of using sebacic acid as the dicarboxylic acid, its sodium atom concentration is preferably from 1 to 500 ppm, more preferably from 10 to 300 ppm, and still more preferably from 20 to 200 ppm. When the sodium atom concentration falls within the foregoing range, the reactivity on the occasion of synthesizing the polyether polyamide is good, the molecular weight can be easily controlled to an appropriate range, and furthermore, the use amount of the alkali metal compound which is blended for the purpose of adjusting the amidation reaction rate as described above can be made small. In addition, an increase of the viscosity on the occasion of melt molding the polyether polyamide composition of the present invention can be suppressed, and not only the moldability becomes favorable, but the generation of scorch at the time of molding processing can be suppressed, and therefore, the quality of the resulting molded article tends to be enhanced.

Such sebacic acid is preferably plant-derived sebacic acid. In view of the fact that the plant-derived sebacic acid contains sulfur compounds or sodium compounds as impurities, the polyether polyamide containing, as a constituent unit, a unit derived from plant-derived sebacic acid is low in terms of the YI value even when an antioxidant is not added, and the YI value of the resulting molded article is also low. In addition, it is preferable to use the plant-derived sebacic acid without excessively purifying the impurities. Since it is not necessary to excessively purify the impurities, such is advantageous from the standpoint of costs, too.

In the case of the plant-derived sebacic acid, its purity is preferably from 99 to 100% by mass, more preferably from 99.5 to 100% by mass, and still more preferably from 99.6 to 100% by mass. When the purity of the plant-derived sebacic acid falls within this range, the quality of the resulting polyether polyamide becomes favorable, so that the polymerization is not affected, and hence, such is preferable.

For example, an amount of other dicarboxylic acid (e.g., 1,10-decamethylenedicarboxylic acid, etc.) which is contained in the sebacic acid is preferably from 0 to 1% by mass, more preferably from 0 to 0.7% by mass, and still more preferably from 0 to 0.6% by mass. When the amount of other dicarboxylic acid falls within this range, the quality of the resulting polyether polyamide becomes favorable, so that the polymerization is not affected, and hence, such is preferable.

In addition, an amount of a monocarboxylic acid (e.g., octanoic acid, nonanoic acid, undecanoic acid, etc.) which is contained in the sebacic acid is preferably from 0 to 1% by mass, more preferably from 0 to 0.5% by mass, and still more preferably from 0 to 0.4% by mass. When the amount of a monocarboxylic acid falls within this range, the quality of the resulting polyether polyamide becomes favorable, so that the polymerization is not affected, and hence, such is preferable.

A hue (APHA) of the sebacic acid is preferably 100 or less, more preferably 75 or less, and still more preferably 50 or less. When the hue of the sebacic acid falls within this range, the YI value of the resulting polyether polyamide is low, and hence, such is preferable. Incidentally, the APHA can be measured in conformity with the Standard Methods for the Analysis of Fats, Oils and Related Materials by the Japan Oil Chemists' Society.

The polyether polyamide (A1) or (A2) obtained by the melt polycondensation is once taken out, pelletized, and then dried for use. In addition, for the purpose of further increasing the degree of polymerization, solid phase polymerization may also be performed. As a heating apparatus which is used for drying or solid phase polymerization, a continuous heat drying apparatus, a rotary drum type heating apparatus called, for example, a tumble dryer, a conical dryer, a rotary dryer, etc., or a cone type heating apparatus equipped with a rotary blade in the inside thereof, called a Nauta mixer, can be suitably used, but the method and the apparatus are not limited to these, and a known method and apparatus can be used.

<Molecular Chain Extender (B)>

The molecular chain extender (B) which is used in the present invention is at least one member selected from a carbodiimide compound and a compound containing two or more epoxy groups in a molecule thereof.

When the molecular chain extender (B) is blended in the above-described polyether polyamide (A1) or (A2), a part or the whole of the molecular chain extender (B) reacts with the above-described polyether polyamide (A1) or (A2) at the time of melt kneading, thereby making it possible to form a polyether polyamide composition having high hydrolysis resistance and also having a high molecular weight. In order to allow the polyether polyamide (A1) or (A2) to have a high molecular weight, it is necessary to perform melt polycondensation for a long period of time; and on that occasion, there may be the case where heat deterioration of the polyether diamine compound (a1-1) or (a2-1) represented by the foregoing general formula (1) or (2) is caused, and therefore, by blending a prescribed amount of the molecular chain extender (B) in the polyether polyamide (A1) or (A2) and heat melting the blend, it is possible to obtain a polyether polyamide composition having a high molecular weight by means of heat melting for a short period of time.

(Carbodiimide Compound)

The carbodiimide compound which is used as the molecular chain extender (B) in the present invention is a compound having one or more carbodiimide groups in a molecule thereof.

Examples of the carbodiimide compound which is used in the present invention include aromatic or aliphatic carbodiimide compounds. Of these, from the standpoints of a degree of revealment of the effect of hydrolysis resistance, melt kneading properties at the time of extrusion, and transparency of the resulting film, it is preferable to use an aliphatic carbodiimide compound, it is more preferable to use an aliphatic polycarbodiimide compound having two or more carbodiimide groups in a molecule thereof, and it is still more preferable to use a polycarbodiimide produced from 4,4'-dicyclohexylmethane diisocyanate. Examples of the polycarbodiimide produced from 4,4'-dicyclohexylmethane diisocyanate include "CARBODILITE LA-1", manufactured by Nisshinbo Holdings Inc. and the like.

As a monocarbodiimide compound having one carbodiimide group in a molecule thereof, which is included in the above-described carbodiimide compound, dicyclohexyl carbodiimide, diisopropyl carbodiimide, dimethyl carbodiimide, diisobutyl carbodiimide, dioctyl carbodiimide, t-butylisopropyl carbodiimide, diphenyl carbodiimide, di-t-butyl carbodiimide, di-β-naphthyl carbodiimide, and the like can be exemplified; and of these, dicyclohexyl carbodiimide and diisopropyl carbodiimide are especially suitable from the standpoint of easiness of industrial availability.

As a polycarbodiimide compound having two or more carbodiimide groups in a molecule thereof, which is included in the above-described carbodiimide compound, those produced by various methods can be used; however, basically, those produced by a conventional production method of a polycarbodiimide can be used. For example, a method of synthesizing a polycarbodiimide compound by subjecting an organic diisocyanate of every kind to a decarboxylation condensation reaction in the presence of a carbodiimidation catalyst at a temperature of about 70° C. or higher in an inert solvent or without using a solvent, and the like can be exemplified.

As the organic diisocyanate that is a synthesis raw material of the above-described polycarbodiimide compound, for example, a variety of organic diisocyanates such as aromatic diisocyanates, aliphatic diisocyanates, etc., and mixtures thereof can be used. Specifically, as the organic diisocyanate, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, 4,4'-dicyclohexylmethane diisocyanate, methylcyclohexane diisocyanate, tetramethylxylylene diisocyanate, 2,6-diisopropylphenyl isocyanate, 1,3,5-triisopropylbenzene-2,4-diisocyanate, and the like can be exemplified. Of these, from the standpoint of melt kneading properties at the time of extrusion of the resulting polycarbodiimide, an aliphatic diisocyanate is preferable, and 4,4'-dicyclohexylmethane diisocyanate is more preferable.

For the purpose of sealing a terminal of the above-described polycarbodiimide compound to control a degree of polymerization thereof, a terminal sealing agent such as a monoisocyanate, etc. can be used. Examples of the monoisocyanate include phenyl isocyanate, tolyl isocyanate, dimethylphenyl isocyanate, cyclohexyl isocyanate, butyl isocyanate, naphthyl isocyanate, and the like.

Incidentally, the terminal sealing agent is not limited to the above-described monoisocyanates, but it may be an active hydrogen compound capable of reacting with the isocyanate. As such an active hydrogen compound, among aliphatic or aromatic compounds, compounds having an —OH group, including methanol, ethanol, phenol, cyclohexanol, N-methylethanolamine, polyethylene glycol monomethyl ether, and polypropylene glycol monomethyl ether; secondary amines such as diethylamine, dicyclohexylamine, etc.; primary amines such as butylamine, cyclohexylamine, etc.; carboxylic acids such as succinic acid, benzoic acid, dicyclohexanecarboxylic acid, etc.; thiols such as ethyl mercaptan, allyl mercaptan, thiophenol, etc.; compounds having an epoxy group; and the like can be exemplified.

As the carbodiimidation catalyst, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers thereof, etc.; metal catalysts such as tetrabutyl titanate, etc.; and the like can be used; and of these, 3-methyl-1-phenyl-2-phospholene-1-oxide is suitable from the standpoint of reactivity.

A number average molecular weight (Mn) of the carbodiimide compound which is used in the present invention is preferably in the range of from 100 to 40,000, and more preferably in the range of from 100 to 30,000 from the viewpoint of dispersibility into the polyether polyamide (A1) or (A2). When the number average molecular weight (Mn) of the carbodiimide compound is 40,000 or less, the dispersibility into the polyether polyamide (A1) or (A2) is favorable, and the effects of the present invention are thoroughly obtained.

(Compound Containing Two or more Epoxy Groups in a Molecule Thereof)

The compound containing two or more epoxy groups in a molecule thereof, which is used as the molecular chain extender (B) in the present invention (hereinafter also referred to as "epoxy group-containing compound"), is not particularly limited so long as it is a compound containing two or more epoxy groups, and any of monomers, oligomers, and polymers can be used.

In the case where the epoxy group-containing compound is a polymer, its weight average molecular weight is preferably from 2,000 to 1,000,000, more preferably from 3,000 to 500,000, and still more preferably from 4,000 to 250,000 from the viewpoints that the hydrolysis resistance is more excellent, the composition hardly gels, and the handling properties are excellent.

Examples of the above-described epoxy-containing compound include an epoxy group-containing (meth)acrylic polymer, an epoxy group-containing polystyrene, an epoxidized vegetable oil, a polyglycidyl ether, and the like.

Above all, the epoxy group-containing compound is preferably an epoxy group-containing (meth)acrylic polymer or a polyglycidyl ether from the viewpoints that the hydrolysis resistance is more preferable, and the composition hardly gels. In addition, an epoxy group-containing (meth)acrylic polymer is more preferable from the viewpoints that the durability is more excellent, and the composition hardly gels. As the epoxy group-containing (meth)acrylic polymer, one that is solid at ordinary temperature is especially preferable.

The epoxy group-containing (meth)acrylic polymer is hereunder described. The epoxy group-containing (meth)acrylic polymer as the molecular chain extender (B) is not particularly limited so long as it is a polymer in which its main chain is a (meth)acrylic polymer, and it contains two or more epoxy groups in a molecule thereof. Incidentally, in the present invention, the term "(meth)acrylic" means either one or both of "acrylic" and "methacrylic".

The (meth)acrylic polymer as a main chain may be either a homopolymer or a copolymer. Examples of the epoxy group-containing (meth)acrylic polymer include a methyl methacrylate-glycidyl methacrylate copolymer, a methyl methacrylate-styrene-glycidyl methacrylate copolymer, and the like.

Above all, the epoxy group-containing (meth)acrylic polymer is preferably a methyl methacrylate-glycidyl methacrylate copolymer or a methyl methacrylate-styrene-glycidyl methacrylate copolymer from the viewpoints that the hydrolysis resistance is more excellent, the composition hardly gels, and the handling properties are excellent.

A weight average molecular weight of the epoxy group-containing (meth)acrylic polymer is preferably from 3,000 to 300,000, and more preferably from 4,000 to 250,000 from the viewpoints that the hydrolysis resistance is more excellent, the composition hardly gels, and the handling properties are excellent.

The polyglycidyl ether is hereunder described. The polyglycidyl ether as the epoxy group-containing compound which is used in the present invention is not particularly limited so long as it is a compound having two or more glycidyloxy groups in a molecule thereof.

Examples of the polyglycidyl ether include a polyglycidyl ether adducted with from 0 to 1 mole of glycerin/epichlorohydrin, a polyglycidyl ether adducted with from 0 to 2 moles of ethylene glycol-epichlorohydrin, polyethylene glycol-diglycidyl ether, neopentyl glycol-diglycidyl ether, trimethylolpropane-polyglycidyl ether, and the like.

An epoxy equivalent of the epoxy group-containing compound is preferably from 170 to 3,300 g/eq., and more preferably from 200 to 2,000 g/eq. from the viewpoints that the hydrolysis resistance is more excellent, and the composition hardly gels.

Commercially available products can be used as the epoxy group-containing compound which is used in the present invention.

Examples of the commercially available product of the epoxy group-containing (meth)acrylic polymer include JONCRYL ADR-4368 (acrylic polymer, powder, weight average molecular weight: 6,800, epoxy equivalent: 285 g/eq., manufactured by BASF SE), MARPROOF G-0150M (acrylic polymer, powder, weight average molecular weight: 8,000 to 10,000, epoxy equivalent: 310 g/eq., manufactured by NOF Corporation), and MARPROOF G-2050M (acrylic polymer, powder, weight average molecular weight: 200,000 to 250,000, epoxy equivalent: 340 g/eq., manufactured by NOF Corporation).

Examples of the commercially available product of the epoxy group-containing polystyrene include MARPROOF G-1010S (styrene-based polymer, powder, weight average molecular weight: 100,000, epoxy equivalent: 1,700 g/eq., manufactured by NOF Corporation).

Examples of the commercially available product of the epoxidized vegetable oil include NEWSIZER 510R (manufactured by NOF Corporation) that is an epoxidized soybean oil and the like.

In the polyether polyamide composition of the present invention, the molecular chain extender (B) can be used solely or in combination of two or more kinds thereof.

A blending amount of the molecular chain extender (B) is from 0.01 to 15 parts by mass, preferably from 0.1 to 10 parts by mass, and more preferably from 0.4 to 4 parts by mass based on 100 parts by mass of the polyether polyamide (A) from the viewpoints that the hydrolysis resistance is more excellent, and the composition hardly gels.

When the above-described blending amount is 0.01 parts by mass or more, an effect for improving the hydrolysis resistance can be thoroughly revealed, whereas when the blending amount is 15 parts by mass or less, it is possible to avoid generation of abrupt thickening on the occasion of producing a polyether polyamide composition.

<Other Components>

The polyether polyamide composition of the present invention can be blended with additives such as a matting agent, an ultraviolet ray absorber, a nucleating agent, a plasticizer, a flame retarder, an antistatic agent, a coloration preventive, a gelation preventive, etc. as the need arises within the range where properties thereof are not hindered.

In addition, the polyether polyamide composition of the present invention can be blended with a thermoplastic resin such as a polyamide resin, a polyester resin, a polyolefin resin, etc. as the need arises within the range where properties thereof are not hindered.

As the polyamide resin, polycaproamide (nylon 6), polyundecanamide (nylon 11), polydodecanamide (nylon 12), polytetramethylene adipamide (nylon 46), polyhexamethylene adipamide (nylon 66), polyhexamethylene azelamide (nylon 69), polyhexamethylene sebacamide (nylon 610), polyundecamethylene adipamide (nylon 116), polyhexamethylene dodecamide (nylon 612), polyhexamethylene terephthalamide (nylon 6T (T represents a terephthalic acid component unit; hereinafter the same)), polyhexamethylene isophthalamide (nylon 6I (I represents an isophthalic acid component unit; hereinafter the same)), polyhexamethylene terephthalisophthalamide (nylon 6TI), polyheptamethylene terephthalamide (nylon 9T), poly-m-xylylene adipamide (nylon MXD6 (MXD represents an m-xylylenediamine component unit; hereinafter the same)), poly-m-xylylene sebacamide (nylon MXD10), poly-p-xylylene sebacamide (nylon PXD10 (PXD represents a p-xylylenediamine component unit)), a polyamide resin obtained by polycondensation of 1,3- or 1,4-bis(aminomethyl)cyclohexane and adipic acid (nylon 1,3-/1,4-BAC6 (BAC represents a bis(aminomethyl)cyclohexane component unit), and copolymerized amides thereof, and the like can be used.

Examples of the polyester resin include a polyethylene terephthalate resin, a polyethylene terephthalate-isophthalate copolymer resin, a polyethylene-1,4-cyclohexane dimethylene-terephthalate copolymer resin, a polyethylene-2,6-naphthalene dicarboxylate resin, a polyethylene-2,6-naphthalene dicarboxylate-terephthalate copolymer resin, a polyethylene-terephthalate-4,4'-biphenyl dicarboxylate copolymer resin, a poly-1,3-propylene-terephthalate resin, a polybutylene terephthalate resin, a polybutylene-2,6-naphthalene dicarboxylate resin, and the like. Examples of the more preferred polyester resin include a polyethylene terephthalate resin, a polyethylene terephthalate-isophthalate copolymer resin, a polybutylene terephthalate resin, and a polyethylene-2,6-naphthalene dicarboxylate resin.

Examples of the polyolefin resin include polyethylenes such as low density polyethylene (LDPE), linear low density polyethylene (LLDPE), very low density polyethylene (VLDPE), medium density polyethylene (MDPE), high density polyethylene (HDPE), etc.; polypropylenes such as a propylene homopolymer, a random or block copolymer of propylene and ethylene or an α-olefin, etc.; mixtures of two or more kinds thereof; and the like. A majority of the polyethylenes is a copolymer of ethylene and an α-olefin. In addition, the polyolefin resin includes a modified polyolefin resin modified with a small amount of a carboxyl group-containing monomer such as acrylic acid, maleic acid, methacrylic acid, maleic anhydride, fumaric acid, itaconic acid, etc. The modification is in general performed by means of copolymerization or graft modification.

By utilizing the polyether polyamide composition of the present invention for at least a part of a thermoplastic resin such as a polyamide resin, a polyester resin, a polyolefin resin, etc., a molded material which is excellent in terms of toughness, flexibility, and tensile elongation at break can be obtained by a molding method such as injection molding, extrusion molding, blow molding, etc.

[Physical Properties of Polyether Polyamide Composition]

In the following description of physical properties, the "polyether polyamide composition" means a polyether polyamide composition containing the polyether polyamide (A1) or a polyether polyamide composition containing the polyether polyamide (A2) unless otherwise specifically indicated.

A relative viscosity of the polyether polyamide composition of the present invention is preferably in the range of from 1.1 to 3.5, more preferably in the range of from 1.1 to 3.3, and still more preferably in the range of from 1.1 to 3.0 from the viewpoints of moldability and melt mixing properties with other resins. The relative viscosity is measured by a method described in the Examples.

A melting point of the polyether polyamide composition is preferably in the range of from 170 to 270° C., more preferably in the range of from 175 to 270° C., and still more preferably in the range of from 180 to 270° C. from the viewpoint of heat resistance. The melting point is measured by a method described in the Examples.

A number average molecular weight (Mn) of the polyether polyamide composition is preferably in the range of from 8,000 to 200,000, more preferably in the range of from 9,000 to 150,000, and still more preferably in the range of from 10,000 to 100,000 from the viewpoints of moldability and melt mixing properties with other resins. The number average molecular weight (Mn) is measured by a method described in the Examples.

From the viewpoints of transparency and appearance, in the case where a thickness of the film is defined as 100 µm, a haze value of the polyether polyamide composition is preferably 50% or less, more preferably 30% or less, and more preferably 10% or less. In addition, from the viewpoints of transparency and appearance, in the case where a thickness of the film is defined as 100 µm, a YI value of the polyether polyamide composition is preferably 10 or less, and more preferably 5 or less. The above-described haze value and YI value are measured by adopting a method in conformity with JIS K7105, specifically by a method described in the Examples.

A rate of tensile elongation at break of the polyether polyamide composition (measurement temperature: 23° C., humidity: 50% RH) is preferably 100% or more, more preferably 200% or more, still more preferably 250% or more, and yet still more preferably 300% or more from the viewpoint of flexibility. Specifically, the rate of tensile elongation at break is measured by a method described in the Examples.

In the case of a polyether polyamide composition containing the polyether polyamide (A1), a tensile modulus of the polyether polyamide composition (measurement temperature: 23° C., humidity: 50% RH) is preferably 100 MPa or more, more preferably 200 MPa or more, still more preferably 300 MPa or more, and yet still more preferably 500 MPa or more from the viewpoints of flexibility and mechanical strength. In addition, in the case of a polyether polyamide composition containing the polyether polyamide (A2), its tensile modulus is preferably 50 MPa or more, more preferably 100 MPa or more, still more preferably 200 MPa or more, yet still more preferably 300 MPa or more, and even yet still more preferably 500 MPa or more. Specifically, the tensile modulus is measured by a method described in the Examples.

In the case of a polyether polyamide composition containing the polyether polyamide (A1), the polyether polyamide composition of the present invention has a retention rate of tensile elongation at break after a lapse of 600 hours of a hydrolysis resistance test as calculated according to the following equation of preferably 65% or more, more preferably 68% or more, still more preferably 70% or more, and yet still more preferably 73% or more. In addition, in the case of a polyether polyamide composition containing the polyether polyamide (A2), its retention rate of tensile elongation at break after a lapse of 600 hours of a hydrolysis resistance test is preferably 50% or more, more preferably 60% or more, still more preferably 65% or more, and yet still more preferably 68% or more.

Retention rate of tensile elongation at break after a lapse of 600 hours of a hydrolysis resistance test (%)=[{Rate of tensile elongation at break of film after a lapse of 600 hours of a hydrolysis resistance test (%)}/{Rate of tensile elongation at break of film after conditioning in distilled water at 100° C. for 72 hours (%)}×100

Here, the rate of tensile elongation at break of film after conditioning in distilled water at 100° C. for 72 hours and the rate of tensile elongation at break of film after a lapse of 600 hours of a hydrolysis resistance test are measured by a method described in the Examples.

[Production of Polyether Polyamide Composition]

It is preferable to produce the polyether polyamide composition of the present invention by blending from 0.01 to 15 parts by mass of the molecular chain extender (B) and if desired, other components in 100 parts by mass of the above-described polyether polyamide (A1) or (A2) and then melt kneading the blend. A method of blending the molecular chain extender (B) is not particularly limited, and examples thereof include a technique in which the molecular chain extender (B) and the like are added to the polyether polyamide (A1) or (A2) in a molten state in a reaction tank; a technique in which the molecular chain extender (B) and the like are dry blended in the polyether polyamide (A1) or (A2), followed by melt kneading by an extruder; and the like.

Examples of a method of melt kneading the polyether polyamide composition of the present invention include a method of performing melt kneading by using every kind of a generally used extruder such as a single-screw or twin-screw extruder, etc. and the like; however, of these, a method of using a twin-screw extruder is preferable from the standpoints of productivity, versatility, and the like. On that occasion, a melt kneading temperature is set up preferably to the range of the melting point of the polyether polyamide (A1) or (A2) or higher and up to a temperature that is higher by 80° C. than the melting point, and more preferably to the range of a temperature that is higher by from 10 to 60° C. than the melting point of the component (A1) or (A2). When the melt kneading temperature is the melting point of the polyether polyamide (A1) or (A2) or higher, the solidification of the component (A1) or (A2) can be suppressed, whereas when it is not higher than a temperature that is higher by 80° C. than the melting point, the heat deterioration of the component (A1) or (A2) can be suppressed.

A retention time of melt kneading is adjusted to preferably the range of from 1 to 10 minutes, and more preferably the range of from 2 to 7 minutes. When the retention time is one minute or more, dispersion between the polyether polyamide (A1) or (A2) and the molecular chain extender (B) becomes sufficient, whereas when the retention time is 10 minutes or less, the heat deterioration of the polyether polyamide (A1) or (A2) can be suppressed.

It is preferable to perform melt kneading by using a twin-screw extruder in which the screw has at least one or more reverse helix element portions and/or kneading disc portions, while allowing a part of the polyether polyamide composition to retain in the subject portion(s).

The melt kneaded polyether polyamide composition may be subjected to extrusion molding as it is, thereby forming into a molded article such as a film, etc., or it may be once formed into pellets, followed by again performing extrusion molding, injection molding, or the like, thereby forming into a variety of molded articles.

[Molded Article]

The molded article of the present invention is one including the above-described polyether polyamide composition and is obtained by molding the polyether polyamide composition of the present invention into a variety of forms by a conventionally known molding method. As the molding method, for example, molding methods such as injection molding, blow molding, extrusion molding, compression molding, vacuum molding, press molding, direct blow molding, rotational molding, sandwich molding, two-color molding, etc. can be exemplified.

The molded article including the polyether polyamide composition of the present invention has, in addition to excellent hydrolysis resistance and transparency, mechanical properties such as flexibility, tensile elongation at break, etc. and is suitable as automobile parts, electric parts, electronic parts, and the like. In particular, as the molded article composed of the polyether polyamide composition, hoses, tubes, or metal covering materials are preferable.

EXAMPLES

The present invention is hereunder described in more detail by reference to the Examples, but it should not be construed that the present invention is limited thereto. Incidentally, in the present Examples, various measurements were performed by the following methods.

1) Relative Viscosity ($\eta r$)

0.2 g of a sample was accurately weighed and dissolved in 20 mL of 96% sulfuric acid at from 20 to 30° C. with stirring. After completely dissolving, 5 mL of the solution was rapidly taken into a Cannon-Fenske viscometer, allowed to stand in a thermostat at 25° C. for 10 minutes, and then measured for a fall time (t). In addition, a fall time ($t_0$) of the 96% sulfuric acid itself was similarly measured. A relative viscosity was calculated from t and to according to the following equation.

$$\text{Relative viscosity} = t/t_0$$

2) Number Average Molecular Weight (Mn)

First of all, a sample was dissolved in a phenol/ethanol mixed solvent and a benzyl alcohol solvent, respectively, and a terminal carboxyl group concentration and a terminal amino group concentration were determined by means of neutralization titration in hydrochloric acid and a sodium hydroxide aqueous solution, respectively. A number average molecular weight was determined from quantitative values of the terminal amino group concentration and the terminal carboxyl group concentration according to the following equation.

$$\text{Number average molecular weight} = 2 \times 1{,}000{,}000/([NH_2]+[COOH])$$

[$NH_2$]: Terminal amino group concentration ($\mu eq/g$)
[COOH]: Terminal carboxyl group concentration ($\mu eq/g$)

3) Differential Scanning Calorimetry (Glass Transition Temperature, Crystallization Temperature, and Melting Point)

The differential scanning calorimetry was performed in conformity with JIS K7121 and K7122. By using a differential scanning calorimeter (a trade name: DSC-60, manufactured by Shimadzu Corporation), each sample was charged in a DSC measurement pan and subjected to a pre-treatment of raising the temperature to 300° C. in a nitrogen atmosphere at a temperature rise rate of 10° C./min and rapid cooling, followed by performing the measurement. As for the measurement condition, the temperature was raised at a rate of 10° C./min, and after keeping at 300° C. for 5 minutes, the temperature was dropped to 100° C. at a rate of −5° C./min, thereby measuring a glass transition temperature Tg, a crystallization temperature Tch, and a melting point Tm.

4) Evaluation of Optical Physical Properties (Haze and YI)

The haze and YI were measured in conformity with JIS K7105. A fabricated film having a thickness of about 100 μm was cut out in a size of 50 mm×50 mm to prepare a test piece. A haze measuring apparatus (Model: COH-300A, manufactured by Nippon Denshoku Industries Co., Ltd.) was used as a measuring apparatus.

5) Tensile Test (Tensile Modulus, Rate of Tensile Elongation at Break, and Retention Rate of Tensile Elongation at Break)

(Measurement of Tensile Modulus and Rate of Tensile Elongation at Break)

The tensile modulus and the rate of tensile elongation at break were measured in conformity with JIS K7161. A fabricated film having a thickness of about 100 μm was cut out in a size of 10 mm×100 mm to prepare a test piece. The tensile test was carried out using a tensile tester (strograph, manufactured by Toyo Seiki Seisaku-sho, Ltd.) under conditions at a measurement temperature of 23° C. and a humidity of 50% RH and at a tensile rate of 50 mm/min in a chuck-to-chuck distance of 50 mm, thereby determining a tensile modulus and a rate of tensile elongation at break.

(Measurement of Retention Rate of Tensile Elongation at Break <Hydrolysis Resistance Test>)

A fabricated film having a thickness of about 100 μm was conditioned in distilled water at 100° C. for 72 hours. Subsequently, the conditioned film was put in distilled water at 100° C.; this time was defined as a starting time of a hydrolysis resistance test; and the film after conditioning and films with a lapse of time of 200, 400 and 600 hours, respectively after starting the hydrolysis resistance test were subjected to a tensile test in conformity with JIS K7127, thereby determining a rate of tensile elongation at break (%), Incidentally, the measurement was carried out using a tensile tester (strograph, manufactured by Toyo Seiki Seisaku-sho, Ltd.) as an apparatus under conditions while setting a test piece width to 10 mm and a chuck-to-chuck distance to 50 mm, respectively at a tensile rate of 50 mm/min, a measurement temperature of 23° C. and a humidity of 50% RH. A ratio in the rate of tensile elongation at break between the film after conditioning and the film with a lapse of a prescribed time after starting the hydrolysis resistance test was defined as a retention rate of tensile elongation at break, and the retention rate of tensile elongation at break (%) was calculated according to the following equation. It is meant that the higher this retention rate of tensile elongation at break, the more excellent the hydrolysis resistance is.

Retention rate of tensile elongation at break after a lapse of 600 hours of a hydrolysis resistance test (%)=[{Rate of tensile elongation at break of film after a lapse of a prescribed time of a hydrolysis resistance test (%)}/{Rate of tensile elongation at break of film after conditioning in distilled water at 100° C. for 72 hours (%)}× 100

6) Sulfur Atom Concentration

Sebacic acid used in each of the Examples was subjected to tablet molding with a press machine, followed by carrying out a fluorescent X-ray analysis (XRF). A fluorescent X-ray analyzer (a trade name: ZSX Primus, manufactured by Rigaku Corporation) was used, and an Rh vacuum tube (4 kW) was used as a vacuum tube. A polypropylene film was used as a film for analyzer window, and EZ scanning was carried out in an irradiation region of 30 mmϕ in a vacuum atmosphere.

Example 1-1

In a reaction vessel having a capacity of about 3 L and equipped with a stirrer, a nitrogen gas inlet, and a condensed water discharge port, 505.6 g of sebacic acid, 0.499 g of sodium hypophosphite monohydrate, and 0.348 g of sodium acetate were charged, and after thoroughly purging the inside of the vessel with nitrogen, the mixture was melted at 170° C. while feeding a nitrogen gas at a rate of 20 mL/min. A mixed liquid of 306.4 g of m-xylylenediamine (MXDA) (manufactured by Mitsubishi Gas Chemical Company, Inc.) and 250.0 g of a polyether diamine (a trade name: XTJ-542, manufactured by Huntsman Corporation, USA) was added dropwise thereto by setting up a polymerization temperature at the time of completion of dropwise addition of the diamine components to 240° C. while gradually raising the temperature to the subject temperature, and the mixture was polymerized for about 2 hours after starting the dropwise addition of the diamine components, thereby obtaining a polyether polyamide (A1). ηr=1.29, [COOH]=110.8 μeq/g, [NH$_2$]=38.4 μeq/g, Mn=14,368, Tg=29.2° C., Tch=58.0° C., Tm=185.0° C.

Subsequently, 100 parts by mass of the resulting polyether polyamide (A1) and 2 parts by mass of, as a molecular chain extender, an aliphatic polycarbodiimide compound (B1) (a trade name: CARBODILITE LA-1, manufactured by Nisshinbo Holdings Inc.) were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 40° C., thereby obtaining a non-stretched film having a thickness of about 100 μm and composed of a polyether polyamide composition.

The resulting film was subjected to the above-described evaluations. Results are shown in Table 1.

Example 1-2

A polyether polyamide (A1) was obtained in the same manner as that in Example 1-1, except that in Example 1-1, the amount of the m-xylylenediamine and the amount of the polyether diamine (a trade name: XTJ-542, manufactured by Huntsman Corporation, USA) were changed to 272.4 g and 500.0 g, respectively. ηr=1.20, [COOH]=112.7 μeq/g, [NH$_2$]=67.2 μeq/g, Mn=11,119, Tg=13.7° C., Tch=46.0° C., Tm=182.7° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1, followed by performing the above-described evaluations. Results are shown in Table 1.

Example 1-3

A non-stretched film having a thickness of about 100 μm and composed of a polyether polyamide composition was obtained in the same manner as that in Example 1-1, except that in Example 1-1, the blending amount of the CARBODILITE LA-1 was changed to 10 parts by mass, followed by performing the above-described evaluations. Results are shown in Table 1.

Example 1-4

A polyether polyamide (A1) was obtained in the same manner as that in Example 1-1, except that in Example 1-1, 306.4 g of m-xylylenediamine was changed to 214.5 g of m-xylylenediamine and 91.9 g of p-xylylenediamine (PXDA) (manufactured by Mitsubishi Gas Chemical Company, Inc.). ηr=1.31, [COOH]=81.6 μeq/g, [NH$_2$]=69.0 μeq/g, Mn=13,283, Tg=12.9° C., Tch=69.5° C., Tm=204.5° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1-1, followed by performing the above-described evaluations. Results are shown in Table 1.

Example 1-5

A polyether polyamide (A1) was obtained in the same manner as that in Example 1-1, except that in Example 1-1, 306.4 g of m-xylylenediamine was changed to 91.9 g of m-xylylenediamine and 214.5 g of p-xylylenediamine, and that the polymerization temperature at the time of completion of the dropwise addition of the diamine components was set up to 270° C. ηr=1.29, [COOH]=64.6 μeq/g, [NH$_2$]=62.8 μeq/g, Mn=15,704, Tg=38.0° C., Tch=68.0° C., Tm=253.0° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1-1, except that each temperature of the cylinder and the T die was set up to 280° C., followed by performing the above-described evaluations. Results are shown in Table 1.

Example 1-6

In a reaction vessel having a capacity of about 3 L and equipped with a stirrer, a nitrogen gas inlet, and a condensed water discharge port, 584.6 g of adipic acid, 0.683 g of sodium hypophosphite monohydrate, and 0.476 g of sodium acetate were charged, and after thoroughly purging the inside of the vessel with nitrogen, the mixture was melted at 170° C. while feeding a nitrogen gas at a rate of 20 mL/min. A mixed liquid of 490.3 g of m-xylylenediamine (MXDA) (manufactured by Mitsubishi Gas Chemical Company, Inc.) and 400.00 g of a polyether diamine (a trade name: XTJ-542, manufactured by Huntsman Corporation, USA) was added dropwise thereto by setting up a polymerization temperature at the time of completion of dropwise addition of the diamine components to 260° C. while gradually raising the temperature to the subject temperature, and the mixture was polymerized for about 2 hours after starting the dropwise addition of the diamine components, thereby obtaining a polyether polyamide (A1). ηr=1.38, [COOH]=110.17 μeq/g, [NH$_2$]=59.57 μeq/g, Mn=11,783, Tg=71.7° C., Tch=108.3° C., Tm=232.8° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1-1, except that each temperature of the cylinder and the T die was set up to 260° C., followed by performing the above-described evaluations. Results are shown in Table 1.

Example 1-7

A polyether polyamide (A1) was obtained in the same manner as that in Example 1-6, except that in Example 1-6, 490.3 g of m-xylylenediamine was changed to 343.2 g of m-xylylenediamine and 147.1 g of p-xylylenediamine, and that the polymerization temperature at the time of completion of the dropwise addition of the diamine components was set up to 270° C. ηr=1.36, [COOH]=64.8 μeq/g, [NH$_2$]=100.7 μeq/g, Mn=12,083, Tg=79.3° C., Tch=107.1° C., Tm=251.4° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1-1, followed by performing the above-described evaluations. Results are shown in Table 1.

Example 1-8

A polyether polyamide (A1) was obtained in the same manner as that in Example 1-6, except that in Example 1-6, 490.3 g of m-xylylenediamine was changed to 294.2 g of m-xylylenediamine and 196.1 g of p-xylylenediamine, and that the polymerization temperature at the time of completion of the dropwise addition of the diamine components was set up to 270° C. ηr=1.36, [COOH]=84.5 μeq/g, [NH$_2$]=85.6 μeq/g, Mn=11,760, Tg=61.2° C., Tch=104.8° C., Tm=262.1° C.

By using 100 parts by mass of the resulting polyether polyamide (A1) and 2 parts by mass of CARBODILITE LA-1 as the molecular chain extender, a non-stretched film having a thickness of about 100 μm and composed of a polyether polyamide composition was obtained in the same manner as that in Example 1-1, except that each temperature of the cylinder and the T die was set up to 280° C., followed by performing the above-described evaluations. Results are shown in Table 1.

Examples 1-9 TO 1-13

Non-stretched films each having a thickness of about 100 μm and composed of a polyether polyamide composition were obtained in the same manner as that in Example 1-1, except that in Example 1-1, the kind and amount of the molecular chain extender were changed, respectively as shown in Table 1, followed by performing the above-described evaluations. Results are shown in Table 1.

Comparative Example 1-1

100 parts by mass of nylon-6 (a trade name: UBE NYLON 1024B, manufactured by Ube Industries, Ltd.) and 2 parts by mass of, as a molecular chain extender, an aliphatic polycarbodiimide compound (B1) (a trade name: CARBODILITE LA-1, manufactured by Nisshinbo Holdings Inc.) were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 50° C., thereby obtaining a non-stretched film having a thickness of about 100 μm.

The resulting film was subjected to the above-described evaluations. Results are shown in Table 2.

Comparative Example 1-2

A non-stretched film having a thickness of about 100 μm was obtained in the same manner as in Comparative Example 1-1, except that the molecular chain extender was not blended, followed by performing the above-described evaluations. Results are shown in Table 2.

Comparative Example 1-3

A non-stretched film having a thickness of about 100 μm was obtained in the same manner as in Example 1-1, except that the molecular chain extender was not blended, followed by performing the above-described evaluations. Results are shown in Table 2.

Comparative Example 1-4

Though it was contemplated to obtain a film in the same manner as that in Example 1-1, except that in Example 1-1, the blending amount of the CARBODILITE LA-1 was changed to 20 parts by mass based on 100 parts by mass of the polyether polyamide, an increase of the viscosity was remarkable, and the extrusion properties were poor, so that film formation could not be achieved. Results are shown in Table 2.

Comparative Example 1-5

90 parts by mass of poly-m-xylyleneadipamide (a trade name of MX NYLON S6001 for a polyamide resin composed of m-xylylenediamine and adipic acid, manufactured by Mitsubishi Gas Chemical Company, Inc.), 10 parts by mass of nylon-12 (a trade name: UBESTA 3030XA, manufactured by Ube Industries, Ltd.), and 2 parts by mass of, as a molecular chain extender, CARBODILITE LA-1 were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 40° C., thereby obtaining a non-stretched film having a thickness of about 100 μm.

The resulting film was subjected to the above-described evaluations. Results are shown in Table 2.

Incidentally, the abbreviations in the table are as follows.

XTJ-542: Polyether diamine, manufactured by Huntsman Corporation, USA According to the catalog of Huntsman Corporation, USA, in the foregoing general formula (1), an approximate figure of (x1+z1) is 6.0, and an approximate figure of y1 is 9.0, and a number average molecular weight is 1,000.

Aliphatic polycarbodiimide compound (B1): A trade name: CARBODILITE LA-1, manufactured by Nisshinbo Holdings Inc.

Aliphatic monocarbodiimide compound (B2): N,N'-Diisopropyl carbodiimide, manufactured by Tokyo Chemical Industry Co., Ltd.

Aromatic polycarbodiimide compound (B3): A trade name: STABAXOL P400, manufactured by Rhein Chemie Rheinau GmbH Epoxy group-containing (meth)acrylic polymer (B4): A trade name: JONCRYL ADR-4368, manufactured by BASF SE, weight average molecular weight: 6,800, epoxy equivalent: 285 g/eq.

TABLE 1

| | | | | | Examples | | | | |
|---|---|---|---|---|---|---|---|---|---|
| | | | | | 1-1 | 1-2 | 1-3 | 1-4 | 1-5 |
| Polyamide composition | (A1) Composition of polyether polyamide (molar ratio) | Diamine | (a1-1) | XTJ-542 | 10 | 20 | 10 | 10 | 10 |
| | | | (a-2) | Xylylenediamine (MXDA/PXDA molar ratio) | 90 (100/0) | 80 (100/0) | 90 (100/0) | 90 (70/30) | 90 (30/70) |
| | | Dicarboxylic acid | | Adipic acid | — | — | — | — | — |
| | | | | Sebacic acid | 100 | 100 | 100 | 100 | 100 |
| | | | | Sulfur atom concentration (ppm) | 70 | 70 | 70 | 70 | 70 |
| | (B) Molecular chain extender (parts by mass)*1 | (B1) CARBODILITE LA-1*2 | | | 2 | 2 | 10 | 2 | 2 |
| | | (B2) N,N'-Diisopropyl carbodiimide | | | — | — | — | — | — |
| | | (B3) STABAXOL P400*3 | | | — | — | — | — | — |
| | | (B4) JONCRYL ADR-4368*4 | | | — | — | — | — | — |
| Evaluation results | Physical properties of polyamide composition | Glass transition temperature (° C.) | | | 29.3 | 14.2 | 30.1 | 13.7 | 38.5 |
| | | Melting point (° C.) | | | 184.2 | 183.8 | 184.7 | 205.7 | 252.7 |
| | | Relative viscosity | | | 1.33 | 1.25 | 1.35 | 1.34 | 1.32 |
| | | Number average molecular weight | | | 21552 | 16678 | 27682 | 19924 | 23555 |
| | | Haze value (%) | | | 2 | 1 | 2 | 16 | 18 |
| | | YI value | | | 1 | 1 | 2 | 1 | 2 |
| | | Rate of tensile elongation at break (%) | | | 430 | 531 | 460 | 380 | 412 |
| | | Tensile modulus (MPa) | | | 635 | 217 | 640 | 750 | 915 |
| | Retention rate of tensile elongation at break (%) | After 0 hour | | | 100 | 100 | 100 | 100 | 100 |
| | | After 200 hours | | | 88 | 86 | 90 | 92 | 95 |
| | | After 400 hours | | | 80 | 78 | 85 | 84 | 88 |
| | | After 600 hours | | | 74 | 70 | 77 | 78 | 82 |

| | | | | | Examples | | | | |
|---|---|---|---|---|---|---|---|---|---|
| | | | | | 1-6 | 1-7 | 1-8 | 1-9 | 1-10 |
| Polyamide composition | (A1) Composition of polyether polyamide (molar ratio) | Diamine | (a1-1) | XTJ-542 | 10 | 10 | 10 | 10 | 10 |
| | | | (a-2) | Xylylenediamine (MXDA/PXDA molar ratio) | 90 (100/0) | 90 (70/30) | 90 (60/40) | 90 (100/0) | 90 (100/0) |
| | | Dicarboxylic acid | | Adipic acid | 100 | 100 | 100 | — | — |
| | | | | Sebacic acid | — | — | — | 100 | 100 |
| | | | | Sulfur atom concentration (ppm) | — | — | — | 70 | 70 |

TABLE 1-continued

|  |  |  |  |  |  |  |  |
|---|---|---|---|---|---|---|---|
|  | (B) Molecular chain extender (parts by mass)*1 | (B1) CARBODILITE LA-1*2 | 2 | 2 | 2 | 0.5 | 5 |
|  |  | (B2) N,N'-Diisopropyl carbodiimide | — | — | — | — | — |
|  |  | (B3) STABAXOL P400*3 | — | — | — | — | — |
|  |  | (B4) JONCRYL ADR-4368*4 | — | — | — | — | — |
| Evaluation results | Physical properties of polyamide composition | Glass transition temperature (° C.) | 71.6 | 79.5 | 61.3 | 29.2 | 29.7 |
|  |  | Melting point (° C.) | 233.4 | 251.6 | 261.8 | 184.5 | 184.8 |
|  |  | Relative viscosity | 1.40 | 1.40 | 1.41 | 1.33 | 1.34 |
|  |  | Number average molecular weight | 17674 | 18125 | 17640 | 17722 | 25862 |
|  |  | Haze value (%) | 20 | 28 | 32 | 2 | 6 |
|  |  | YI value | 1 | 1 | 1 | 1 | 2 |
|  |  | Rate of tensile elongation at break (%) | 441 | 570 | 472 | 420 | 443 |
|  |  | Tensile modulus (MPa) | 1015 | 1277 | 1330 | 630 | 635 |
|  | Retention rate of tensile elongation at break (%) | After 0 hour | 100 | 100 | 100 | 100 | 100 |
|  |  | After 200 hours | 78 | 81 | 82 | 86 | 90 |
|  |  | After 400 hours | 70 | 73 | 75 | 78 | 84 |
|  |  | After 600 hours | 68 | 71 | 73 | 70 | 74 |

|  |  |  |  |  | Examples | | |
|---|---|---|---|---|---|---|---|
|  |  |  |  |  | 1-11 | 1-12 | 1-13 |
| Polyamide composition | (A1) Composition of polyether polyamide (molar ratio) | Diamine | (a1-1) | XTJ-542 | 10 | 10 | 10 |
|  |  |  | (a-2) | Xylylenediamine (MXDA/PXDA molar ratio) | 90 (100/0) | 90 (100/0) | 90 (100/0) |
|  |  | Dicarboxylic acid |  | Adipic acid | — | — | — |
|  |  |  |  | Sebacic acid | 100 | 100 | 100 |
|  |  |  |  | Sulfur atom concentration (ppm) | 70 | 70 | 70 |
|  | (B) Molecular chain extender (parts by mass)*1 | (B1) CARBODILITE LA-1*2 | | | — | — | — |
|  |  | (B2) N,N'-Diisopropyl carbodiimide | | | 2 | — | — |
|  |  | (B3) STABAXOL P400*3 | | | — | 2 | — |
|  |  | (B4) JONCRYL ADR-4368*4 | | | — | — | 2 |
| Evaluation results | Physical properties of polyamide composition | Glass transition temperature (° C.) | | | 29.5 | 29.3 | 29.3 |
|  |  | Melting point (° C.) | | | 185.0 | 184.5 | 184.5 |
|  |  | Relative viscosity | | | 1.33 | 1.34 | 1.35 |
|  |  | Number average molecular weight | | | 22014 | 22940 | 24921 |
|  |  | Haze value (%) | | | 2 | 8 | 2 |
|  |  | YI value | | | 1 | 1 | 1 |
|  |  | Rate of tensile elongation at break (%) | | | 410 | 410 | 435 |
|  |  | Tensile modulus (MPa) | | | 611 | 602 | 652 |
|  | Retention rate of tensile elongation at break (%) | After 0 hour | | | 100 | 100 | 100 |
|  |  | After 200 hours | | | 88 | 80 | 88 |
|  |  | After 400 hours | | | 79 | 75 | 82 |
|  |  | After 600 hours | | | 73 | 68 | 75 |

*1Blending amount based on 100 parts by mass of the polyether polyamide (A1) (parts by mass)
*2A trade name for an aliphatic polycarbodiimide compound, manufactured by Nisshinbo Holdings Inc.
*3A trade name for an aromatic polycarbodiimide compound, manufactured by Rhein Chemie Rheinau GmbH
*4A trade name for an epoxy group-containing (meth)acrylic polymer, manufactured by BASF SE

TABLE 2

|  |  |  |  |  | Comparative Examples | | | | |
|---|---|---|---|---|---|---|---|---|---|
|  |  |  |  |  | 1-1 | 1-2 | 1-3 | 1-4 | 1-5 |
| Polyamide composition | (A1) Composition of Polyether polyamide (Molar Ratio) | Diamine | (a1-1) | XTJ-542 | — | — | 10 | 10 | — |
|  |  |  | (a-2) | Xylylenediamine (MXDA/PXDA molar ratio) | — | — | 90 (100/0) | 90 (100/0) | — |
|  |  | Dicarboxylic acid |  | Sebacic acid | — | — | 100 | 100 | — |
|  |  |  |  | Sulfur atom concentration (ppm) | — | — | 0 | 0 | — |
|  | Others (Mass ratio) |  | | Nylon-6 | 100 | 100 | — | — | — |
|  |  |  | | Nylon-12 | — | — | — | — | 10 |
|  |  |  | | Poly-m-xylyleneadipamide | — | — | — | — | 90 |
|  | (B) Molecular chain extender (parts by mass)*1 | (B1) CARBODILITE LA-1*2 | | | 2 | — | — | 20 | 2 |

TABLE 2-continued

|  |  |  | Comparative Examples | | | | |
|---|---|---|---|---|---|---|---|
|  |  |  | 1-1 | 1-2 | 1-3 | 1-4 | 1-5 |
| Evaluation results | Physical properties of polyamide composition | Glass transition temperature (° C.) | 46.9 | 46.5 | 29.2 | — |  |
|  |  | Melting point (° C.) | 223.4 | 222.6 | 185.0 | — |  |
|  |  | Relative viscosity | 4.11 | 3.47 | 1.29 |  | 2.45 |
|  |  | Number average molecular weight | 34662 | 27211 | 14368 | — |  |
|  |  | Haze value (%) | 2 | 2 | 2 |  | 68 |
|  |  | YI value | 1 | 1 | 4 |  | 4 |
|  |  | Rate of tensile elongation at break (%) | 263 | 227 | 403 |  | 36 |
|  |  | Tensile modulus (MPa) | 638 | 614 | 633 |  | 2213 |
|  | Retention rate of tensile elongation at break (%) | After 0 hour | 100 | 100 | 100 |  | 100 |
|  |  | After 200 hours | 68 | 61 | 86 |  | 79 |
|  |  | After 400 hours | 38 | 31 | 74 |  | 71 |
|  |  | After 600 hours | 40 | 32 | 64 |  | 66 |

*[1]Blending amount based on 100 parts by mass of the polyether polyamide (A1) (parts by mass)
*[2]A trade name for an aliphatic polycarbodiimide compound, manufactured by Nisshinbo Holdings Inc.

It is understood from the results of Tables 1 and 2 that the polyether polyamide composition of the present invention has hydrolysis resistance and transparency and also has excellent mechanical properties such as flexibility, tensile elongation at break, etc.

Example 2-1

In a reaction vessel having a capacity of about 3 L and equipped with a stirrer, a nitrogen gas inlet, and a condensed water discharge port, 687.65 g of sebacic acid, 0.6612 g of sodium hypophosphite monohydrate, and 0.4605 g of sodium acetate were charged, and after thoroughly purging the inside of the vessel with nitrogen, the mixture was melted at 170° C. while feeding a nitrogen gas at a rate of 20 mL/min. A mixed liquid of 416.77 g of m-xylylenediamine (MXDA) (manufactured by Mitsubishi Gas Chemical Company, Inc.) and 306.00 g of a polyether diamine (a trade name: ED-900, manufactured by Huntsman Corporation, USA) was added dropwise thereto while gradually raising the temperature to 260° C., and the mixture was polymerized for about 2 hours to obtain a polyether polyamide (A2). $\eta r$=1.33, [COOH]=96.88 µeq/g, [$NH_2$]=37.00 µeq/g, Mn=14,939, Tg=22.2° C., Tch=43.0° C., Tm=182.8° C.

Subsequently, 100 parts by mass of the resulting polyether polyamide (A2) and 2 parts by mass of, as a molecular chain extender, an aliphatic polycarbodiimide compound (B1) (a trade name: CARBODILITE LA-1, manufactured by Nisshinbo Holdings Inc.) were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 40° C., thereby obtaining a non-stretched film having a thickness of about 100 µm and composed of a polyether polyamide composition.

The resulting film was subjected to the above-described evaluations. Results are shown in Table 3.

Example 2-2

In a reaction vessel having a capacity of about 3 L and equipped with a stirrer, a nitrogen gas inlet, and a condensed water discharge port, 566.30 g of sebacic acid, 0.6543 g of sodium hypophosphite monohydrate, and 0.4557 g of sodium acetate were charged, and after thoroughly purging the inside of the vessel with nitrogen, the mixture was melted at 170° C. while feeding a nitrogen gas at a rate of 20 mL/min. A mixed liquid of 305.09 g of m-xylylenediamine (MXDA) (manufactured by Mitsubishi Gas Chemical Company, Inc.) and 504.00 g of a polyether diamine (a trade name: ED-900, manufactured by Huntsman Corporation, USA) was added dropwise thereto while gradually raising the temperature to 260° C., and the mixture was polymerized for about 2 hours to obtain a polyether polyamide (A2). $\eta r$=1.24, [COOH]=141.80 µeq/g, [$NH_2$]=83.03 µeq/g, Mn=8,895, Tm=175.5° C.

By using 100 parts by mass of the resulting polyether polyamide (A2) and 2 parts by mass of CARBODILITE LA-1 as the molecular chain extender, a non-stretched film having a thickness of about 100 µm and composed of a polyether polyamide composition was obtained in the same manner as that in Example 2-1, followed by performing the above-described evaluations. Results are shown in Table 3.

Example 2-3

A non-stretched film having a thickness of about 100 µm and composed of a polyether polyamide composition was obtained in the same manner as that in Example 2-1, except that in Example 2-1, the blending amount of the CARBODILITE LA-1 was changed to 10 parts by mass, followed by performing the above-described evaluations. Results are shown in Table 3.

Example 2-4

In a reaction vessel having a capacity of about 3 L and equipped with a stirrer, a nitrogen gas inlet, and a condensed water discharge port, 687.65 g of sebacic acid, 0.6612 g of sodium hypophosphite monohydrate, and 0.4605 g of sodium acetate were charged, and after thoroughly purging the inside of the vessel with nitrogen, the mixture was melted at 170° C. while feeding a nitrogen gas at a rate of 20 mL/min. A mixed liquid of 291.74 g of m-xylylenediamine (MXDA) (manufactured by Mitsubishi Gas Chemical Company, Inc.) and 125.03 g of p-xylylenediamine (PXDA) (manufactured by Mitsubishi Gas Chemical Company, Inc.) (molar ratio (MXDA/PXDA=70/30)) and 306.00 g of a polyether diamine (a trade name: ED-900, available from Huntsman Corporation, USA) was added dropwise thereto while gradually raising the temperature to 260° C., and the mixture was polymerized for about 2 hours to obtain a polyether polyamide (A2). ηr=1.36, [COOH]=66.35 μeq/g, [NH$_2$]=74.13 μeq/g, Mn=14,237, Tg=16.9° C., Tch=52.9° C., Tm=201.9° C.

By using 100 parts by mass of the resulting polyether polyamide (A2) and 2 parts by mass of CARBODILITE LA-1 as the molecular chain extender, a non-stretched film having a thickness of about 100 μm and composed of a polyether polyamide composition was obtained in the same manner as that in Example 2-1, followed by performing the above-described evaluations. Results are shown in Table 3.

Example 2-5

A polyether polyamide (A2) was obtained in the same manner as that in Example 2-4, except that in Example 2-4, 306.00 g of the polyether diamine (a trade name: ED-900, manufactured by Huntsman Corporation, USA) was changed to 204.00 g of a polyether diamine (a trade name: ED-600, manufactured by Huntsman Corporation, USA). ηr=1.36, [COOH]=102.39 μeq/g, [NH$_2$]=33.90 μeq/g, Mn=14,675, Tg=26.8° C., Tch=67.8° C., Tm=202.1° C.

By using 100 parts by mass of the resulting polyether polyamide and 2 parts by mass of CARBODILITE LA-1 as the molecular chain extender, a non-stretched film having a thickness of about 100 μm and composed of a polyether polyamide composition was obtained in the same manner as that in Example 2-1, followed by performing the above-described evaluations. Results are shown in Table 3.

Example 2-6

In a reaction vessel having a capacity of about 3 L and equipped with a stirrer, a nitrogen gas inlet, and a condensed water discharge port, 584.60 g of adipic acid, 0.6613 g of sodium hypophosphite monohydrate, and 0.4606 g of sodium acetate were charged, and after thoroughly purging the inside of the vessel with nitrogen, the mixture was melted at 170° C. while feeding a nitrogen gas at a rate of 20 mL/min. A mixed liquid of 489.34 g of m-xylylenediamine (MXDA) (manufactured by Mitsubishi Gas Chemical Company, Inc.) and 359.28 g of a polyether diamine (a trade name: ED-900, manufactured by Huntsman Corporation, USA) was added dropwise thereto while gradually raising the temperature to 260° C., and the mixture was polymerized for about 2 hours to obtain a polyether polyamide (A2). ηr=1.35, [COOH]=73.24 μeq/g, [NH$_2$]=45.92 μeq/g, Mn=16,784, Tg=42.1° C., Tch=89.7° C., Tm=227.5° C.

By using 100 parts by mass of the resulting polyether polyamide (A2) and 2 parts by mass of CARBODILITE LA-1 as the molecular chain extender, a non-stretched film having a thickness of about 100 μm and composed of a polyether polyamide composition was obtained in the same manner as that in Example 2-1, followed by performing the above-described evaluations. Results are shown in Table 3.

Example 2-7

In a reaction vessel having a capacity of about 3 L and equipped with a stirrer, a nitrogen gas inlet, and a condensed water discharge port, 584.60 g of adipic acid, 0.6626 g of sodium hypophosphite monohydrate, and 0.4616 g of sodium acetate were charged, and after thoroughly purging the inside of the vessel with nitrogen, the mixture was melted at 170° C. while feeding a nitrogen gas at a rate of 20 mL/min. A mixed liquid of 343.22 g of m-xylylenediamine (MXDA) (manufactured by Mitsubishi Gas Chemical Company, Inc.) and 147.10 g of p-xylylenediamine (PXDA) (manufactured by Mitsubishi Gas Chemical Company, Inc.) (molar ratio (MXDA/PXDA=70/30)) and 360.00 g of a polyether diamine (a trade name: ED-900, manufactured by Huntsman Corporation, USA) was added dropwise thereto while gradually raising the temperature to 260° C., and the mixture was polymerized for about 2 hours to obtain a polyether polyamide (A2): ηr=1.34, [COOH]=75.95 μeq/g, [NH$_2$]=61.83 μeq/g, Mn=14,516, Tg=33.2° C., Tch=73.9° C., Tm=246.2° C.

By using 100 parts by mass of the resulting polyether polyamide (A2) and 2 parts by mass of CARBODILITE LA-1 as the molecular chain extender, a non-stretched film having a thickness of about 100 μm and composed of a polyether polyamide composition was obtained in the same manner as that in Example 2-1, except that each temperature of the cylinder and the T die was set up to 280° C., followed by performing the above-described evaluations. Results are shown in Table 3.

Examples 2-8 to 2-12

Non-stretched films each having a thickness of about 100 μm and composed of a polyether polyamide composition were obtained in the same manner as that in Example 2-1, except that in Example 2-1, the kind and amount of the molecular chain extender were changed, respectively as shown in Table 3, followed by performing the above-described evaluations. Results are shown in Table 3.

Comparative Example 2-1

100 parts by mass of nylon-6 (a trade name: UBE NYLON 1024B, manufactured by Ube Industries, Ltd.) and 2 parts by mass of, as a molecular chain extender, an aliphatic polycarbodiimide compound (B1) (a trade name: CARBODILITE LA-1, manufactured by Nisshinbo Holdings Inc.) were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 50° C., thereby obtaining a non-stretched film having a thickness of about 100 μm.

The resulting film was subjected to the above-described evaluations. Results are shown in Table 4.

Comparative Example 2-2

A non-stretched film having a thickness of about 100 μm was obtained in the same manner as in Comparative Example 2-1, except that the molecular chain extender was not blended, followed by performing the above-described evaluations. Results are shown in Table 4.

Comparative Example 2-3

A non-stretched film having a thickness of about 100 μm was obtained in the same manner as in Example 2-1, except that the molecular chain extender was not blended, followed by performing the above-described evaluations. Results are shown in Table 4.

Comparative Example 2-4

Though it was contemplated to obtain a film in the same manner as that in Example 2-1, except for changing the blending amount of the molecular chain extender to 20 parts by mass based on 100 parts by mass of the polyether polyamide, an increase of the viscosity was remarkable, and the extrusion properties were poor, so that film formation could not be achieved. Results are shown in Table 4.

Comparative Example 2-5

90 parts by mass of poly-m-xylyleneadipamide (a trade name of MX NYLON S6001 for a polyamide resin composed of m-xylylenediamine and adipic acid, manufactured by Mitsubishi Gas Chemical Company, Inc.), 10 parts by mass of nylon-12 (a trade name: UBESTA 3030XA, manufactured by Ube Industries, Ltd.), and 2 parts by mass of, as a carbodiimide compound, an aliphatic polycarbodiimide compound (B1) (a trade name: CARBODILITE LA-1, manufactured by Nisshinbo Holdings Inc.) were dry blended; and the blend was melt kneaded with a twin-screw extruder equipped with a screw having a diameter of 28 mm and having a kneading section composed of a kneading disk, an open vent, and a T die at a cylinder temperature of 240° C. and subjected to extrusion molding in a film form from the T die set up to a temperature of 240° C., followed by cooling with metal rolls set up to a temperature of 40° C., thereby obtaining a non-stretched film having a thickness of about 100 μm.

The resulting film was subjected to the above-described evaluations. Results are shown in Table 4.

Incidentally, the abbreviations in the table are as follows.

ED-900: Polyether diamine, manufactured by Huntsman Corporation, USA According to the catalog of Huntsman Corporation, USA, in the formula (2), an approximate figure of (x2+z2) is 6.0, and an approximate figure of y2 is 12.5, and a number average molecular weight is 900.

ED-600: Polyether diamine, manufactured by Huntsman Corporation, USA According to the catalog of Huntsman Corporation, USA, in the formula (2), an approximate figure of (x2+z2) is 3.0, and an approximate figure of y2 is 9.0, and a number average molecular weight is 600.

Aliphatic polycarbodiimide compound (B1): A trade name: CARBODILITE LA-1, manufactured by Nisshinbo Holdings Inc.

Aliphatic monocarbodiimide compound (B2): N,N'-Diisopropyl carbodiimide, manufactured by Tokyo Chemical Industry Co., Ltd.

Aromatic polycarbodiimide compound (B3): A trade name: STABAXOL P400, manufactured by Rhein Chemie Rheinau GmbH Epoxy group-containing (meth)acrylic polymer (B4): A trade name: JONCRYL ADR-4368, manufactured by BASF SE, weight average molecular weight: 6,800, epoxy equivalent: 285 g/eq.

TABLE 3

| | | | | | | Examples | | | |
|---|---|---|---|---|---|---|---|---|---|
| | | | | | | 2-1 | 2-2 | 2-3 | 2-4 |
| Polymide composition | (A2) Composition of Polyether polyamide (Molar ratio) | Diamine | (a2-1) | | ED-900 | 10 | 20 | 10 | 10 |
| | | | | | ED-600 | — | — | — | — |
| | | | (a-2) | | Xylylenediamine (MXDA/PXDA molar ratio) | 90 (100/0) | 80 (100/0) | 90 (100/0) | 90 (70/30) |
| | | Dicarboxylic acid | | | Adipic acid | — | — | — | — |
| | | | | | Sebacic acid | 100 | 100 | 100 | 100 |
| | | | | | Sulfur atom concentration (ppm) | 70 | 70 | 70 | 70 |
| | (B) Molecular chain extender (parts by mass)*1 | | (B1) CARBODILITE LA-1*2 | | | 2 | 2 | 10 | 2 |
| | | | (B2) N,N'-Diisopropyl carbodiimide | | | — | — | — | — |
| | | | (B3) STABAXOL P400*3 | | | — | — | — | — |
| | | | (B4) JONCRYL ADR-4368*4 | | | — | — | — | — |
| Evaluation results | Physical properties of polyamide composition | Glass transition temperature (° C.) | | | | 22.4 | — | 22.6 | 16.9 |
| | | Melting point (° C.) | | | | 183.1 | 175.5 | 183.3 | 201.9 |
| | | Relative viscosity | | | | 1.35 | 1.29 | 1.37 | 1.39 |
| | | Number average molecular weight | | | | 22408 | 13342 | 29878 | 21355 |
| | | Haze value (%) | | | | 1 | 1 | 5 | 2 |
| | | YI value | | | | 1 | 2 | 2 | 2 |
| | | Rate of tensile elongation at break (%) | | | | 453 | 650 | 482 | 427 |
| | | Tensile modulus (MPa) | | | | 220 | 85 | 218 | 323 |
| | | Retention rate of tensile elongation at break (%) | After 0 hour | | | 100 | 100 | 100 | 100 |
| | | | After 200 hours | | | 80 | 76 | 84 | 84 |
| | | | After 400 hours | | | 72 | 68 | 79 | 77 |
| | | | After 600 hours | | | 66 | 60 | 71 | 72 |

| | | | | | | Examples | | | |
|---|---|---|---|---|---|---|---|---|---|
| | | | | | | 2-5 | 2-6 | 2-7 | 2-8 |
| Polymide composition | (A2) Composition of Polyether polyamide (Molar ratio) | Diamine | (a2-1) | | ED-900 | — | 10 | 10 | 10 |
| | | | | | ED-600 | 10 | — | — | — |
| | | | (a-2) | | Xylylenediamine (MXDA/PXDA molar ratio) | 90 (70/30) | 90 (100/0) | 90 (70/30) | 90 (100/0) |
| | | Dicarboxylic acid | | | Adipic acid | — | 100 | 100 | — |
| | | | | | Sebacic acid | 100 | — | — | 100 |
| | | | | | Sulfur atom concentration (ppm) | 70 | — | — | 70 |

TABLE 3-continued

|  |  |  |  |  |  |  |
|---|---|---|---|---|---|---|
| | (B) Molecular chain extender (parts by mass)*1 | (B1) CARBODILITE LA-1*2 | 2 | 2 | 2 | 0.5 |
| | | (B2) N,N'-Diisopropyl carbodiimide | — | — | — | — |
| | | (B3) STABAXOL P400*3 | — | — | — | — |
| | | (B4) JONCRYL ADR-4368*4 | — | — | — | — |
| Evaluation results | Physical properties of polyamide composition | Glass transition temperature (° C.) | 26.9 | 42.2 | 33.3 | 22.3 |
| | | Melting point (° C.) | 202.4 | 227.3 | 246.1 | 183.0 |
| | | Relative viscosity | 1.39 | 1.38 | 1.36 | 1.35 |
| | | Number average molecular weight | 22012 | 25176 | 21774 | 19421 |
| | | Haze value (%) | 1 | 3 | 4 | 1 |
| | | YI value | 2 | 1 | 1 | 1 |
| | | Rate of tensile elongation at break (%) | 378 | 401 | 354 | 433 |
| | | Tensile modulus (MPa) | 553 | 360 | 391 | 217 |
| | Retention rate of tensile elongation at break (%) | After 0 hour | 100 | 100 | 100 | 100 |
| | | After 200 hours | 78 | 70 | 73 | 78 |
| | | After 400 hours | 70 | 66 | 68 | 71 |
| | | After 600 hours | 65 | 61 | 63 | 64 |

|  |  |  |  |  | Examples | | | |
|---|---|---|---|---|---|---|---|---|
| | | | | | 2-9 | 2-10 | 2-11 | 2-12 |
| Polymide composition | (A2) Composition of Polyether polyamide (Molar ratio) | Diamine | (a2-1) | ED-900 | 10 | 10 | 10 | 10 |
| | | | | ED-600 | — | — | — | — |
| | | | (a-2) | Xylylenediamine (MXDA/PXDA molar ratio) | 90 (100/0) | 90 (100/0) | 90 (100/0) | 90 (100/0) |
| | | Dicarboxylic acid | | Adipic acid | — | — | — | — |
| | | | | Sebacic acid | 100 | 100 | 100 | 100 |
| | | | | Sulfur atom concentration (ppm) | 70 | 70 | 70 | 70 |
| | (B) Molecular chain extender (parts by mass)*1 | (B1) CARBODILITE LA-1*2 | | | 5 | — | — | — |
| | | (B2) N,N'-Diisopropyl carbodiimide | | | — | 2 | — | — |
| | | (B3) STABAXOL P400*3 | | | — | — | 2 | — |
| | | (B4) JONCRYL ADR-4368*4 | | | — | — | — | 2 |
| Evaluation results | Physical properties of polyamide composition | Glass transition temperature (° C.) | | | 22.4 | 22.4 | 22.5 | 22.4 |
| | | Melting point (° C.) | | | 183.3 | 182.4 | 183.2 | 183.5 |
| | | Relative viscosity | | | 1.36 | 1.35 | 1.35 | 1.35 |
| | | Number average molecular weight | | | 26143 | 21545 | 23140 | 24122 |
| | | Haze value (%) | | | 3 | 6 | 10 | 2 |
| | | YI value | | | 2 | 1 | 1 | 1 |
| | | Rate of tensile elongation at break (%) | | | 460 | 443 | 423 | 463 |
| | | Tensile modulus (MPa) | | | 221 | 215 | 205 | 225 |
| | Retention rate of tensile elongation at break (%) | After 0 hour | | | 100 | 100 | 100 | 100 |
| | | After 200 hours | | | 82 | 80 | 77 | 82 |
| | | After 400 hours | | | 74 | 73 | 69 | 74 |
| | | After 600 hours | | | 68 | 65 | 61 | 69 |

*1 Blending amount based on 100 parts by mass of the polyether polyamide (A2) (parts by mass)
*2 A trade name for an aliphatic polycarbodiimide compound, manufactured by Nisshinbo Holdings Inc.
*3 A trade name for an aromatic polycarbodiimide compound, manufactured by Rhein Chemie Rheinau GmbH
*4 A trade name for an epoxy group-containing (meth)acrylic polymer, manufactured by BASF SE

TABLE 4

|  |  |  |  |  | Comparative Examples | | | | |
|---|---|---|---|---|---|---|---|---|---|
| | | | | | 2-1 | 2-2 | 2-3 | 2-4 | 2-5 |
| Polyamide composition | Composition of polyether polymide (A2) (Molar ratio) | Diamine | (a2-1) | ED-900 | — | — | 10 | 10 | — |
| | | | (a-2) | Xylylenediamine (MXDA/PXDA molar ratio) | — | — | 90 (100/0) | 90 (100/0) | — |
| | | Dicarboxylic acid | | Sebacic acid | — | — | 100 | 100 | — |
| | | | | Sulfur atom concentration (ppm) | — | — | 0 | 0 | — |
| | Others (Mass ratio) | | | Nylon-6 | 100 | 100 | — | — | — |
| | | | | Nylon-12 | — | — | — | — | 10 |
| | | | | Poly-m-xylyleneadipamide | — | — | — | — | 90 |
| | (B) Molecular chain extender (parts by mass)*1 | (B1) CARBODILITE LA-1*2 | | | 2 | 0 | — | 20 | 2 |

TABLE 4-continued

|  |  |  | Comparative Examples | | | | |
|---|---|---|---|---|---|---|---|
|  |  |  | 2-1 | 2-2 | 2-3 | 2-4 | 2-5 |
| Evaluation results | Physical properties of polyamide composition | Glass transition temperature (° C.) | 46.9 | 46.5 | 22.2 | — | |
|  |  | Melting point (° C.) | 223.4 | 222.6 | 182.8 | — | |
|  |  | Relative viscosity | 4.11 | 3.47 | 1.33 |  | 2.45 |
|  |  | Number average molecular weight | 34662 | 27211 | 14368 |  | — |
|  |  | Haze value (%) | 2 | 2 | 1 |  | 68 |
|  |  | YI value | 1 | 1 | 4 |  | 4 |
|  |  | Rate of tensile elongation at break (%) | 263 | 227 | 403 |  | 36 |
|  |  | Tensile modulus (MPa) | 638 | 614 | 633 |  | 2213 |
|  | Retention rate of tensile elongation at break (%) | After 0 hour | 100 | 100 | 100 |  | 100 |
|  |  | After 200 hours | 68 | 61 | 66 |  | 79 |
|  |  | After 400 hours | 38 | 31 | 54 |  | 71 |
|  |  | After 600 hours | 40 | 32 | 44 |  | 66 |

*[1]Blending amount based on 100 parts by mass of the polyether polyamide (A2) (parts by mass)
*[2]A trade name for an aliphatic polycarbodiimide compound, manufactured by Nisshinbo Holdings Inc.

It is understood from the results of Tables 3 and 4 that the polyether polyamide composition of the present invention has hydrolysis resistance and transparency and also has excellent mechanical properties such as flexibility, tensile elongation at break, etc.

INDUSTRIAL APPLICABILITY

The polyether polyamide composition of the present invention has hydrolysis resistance and transparency and also has excellent mechanical properties such as flexibility, tensile elongation at break, etc. In addition, the polyether polyamide composition of the present invention is also favorable in terms of melt moldability, toughness, and heat resistance. For that reason, the polyether polyamide composition of the present invention can be suitably used for various industrial parts, gears and connectors of mechanical and electrical precision instruments, fuel tubes around an automobile engine, connector parts, sliding parts, belts, hoses, electric parts and electronic parts such as silent gears, etc., sporting goods, and the like.

The invention claimed is:

1. A polyether polyamide composition comprising 100 parts by mass of a polyether polyamide (A1) in which a diamine constituent unit thereof is derived from a polyether diamine compound (a1-1) represented by the following formula (1) and a xylylenediamine (a-2), and a dicarboxylic acid constituent unit thereof is derived from an α,ω-linear aliphatic dicarboxylic acid having from 4 to 20 carbon atoms, the polyether polyamide (A1) having blended therein from 0.01 to 15 parts by mass of at least one molecular chain extender (B) selected from a carbodiimide compound and a compound containing two or more epoxy groups in a molecule thereof:

(1)

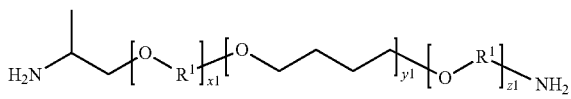

wherein (x1+z1) is from 1 to 30; y1 is from 1 to 50; and $R^1$ represents a propylene group; and wherein the proportion of the constituent unit derived from the xylylenediamine (a-2) in the diamine constituent unit is from 50 to 99.8% by mole.

2. The polyether polyamide composition according to claim 1, wherein the xylylenediamine (a-2) is m-xylylenediamine, p-xylylenediamine, or a mixture thereof.

3. The polyether polyamide composition according to claim 1, wherein the xylylenediamine (a-2) is m-xylylenediamine.

4. The polyether polyamide composition according to claim 1, wherein the xylylenediamine (a-2) is a mixture of m-xylylenediamine and p-xylylenediamine.

5. The polyether polyamide composition according to claim 4, wherein the proportion of the p-xylylenediamine relative to a total amount of m-xylylenediamine and p-xylylenediamine is 90% by mole or less.

6. The polyether polyamide composition according to claim 1, wherein the α, ω-linear aliphatic dicarboxylic acid having from 4 to 20 carbon atoms is at least one member selected from adipic acid and sebacic acid.

7. The polyether polyamide composition according to claim 1, wherein the molecular chain extender (B) is an aliphatic carbodiimide compound.

8. The polyether polyamide composition according to claim 1, wherein the molecular chain extender (B) is an epoxy group-containing (meth)acrylic polymer.

9. The polyether polyamide composition according to claim 1, wherein the relative viscosity of the polyether polyamide composition is from 1.1 to 3.5.

10. The polyether polyamide composition according to claim 1, wherein the melting point of the polyether polyamide composition is from 170 to 270° C.

11. The polyether polyamide composition according to claim 1, wherein a rate of tensile elongation at break at a measurement temperature of 23° C. and a humidity of 50% RH is 100% or more.

12. A method for producing the polyether polyamide composition according to claim 1, which comprises blending 100 parts by mass of the polyether polyamide (A1) with from 0.01 to 15 parts by mass of the molecular chain extender (B) and melt kneading the blend.

13. A molded article comprising the polyether polyamide composition according to claim 1.

14. The polyether polyamide composition according to claim 1, wherein the number average molecular weight of the polyether diamine compound (a1-1) is from 500 to 1,800.

15. A polyether polyamide composition comprising 100 parts by mass of a polyether polyamide (A2) in which a diamine constituent unit thereof is derived from a polyether diamine compound (a2-1) represented by the following formula (2) and a xylylenediamine (a-2), and a dicarboxylic acid constituent unit thereof is derived from an α,ω,-linear aliphatic dicarboxylic acid having from 4 to 20 carbon atoms, the polyether polyamide (A2) having blended therein from 0.01 to 15 parts by mass of at least one molecular chain extender (B) selected from a carbodiimide compound and a compound containing two or more epoxy groups in a molecule thereof:

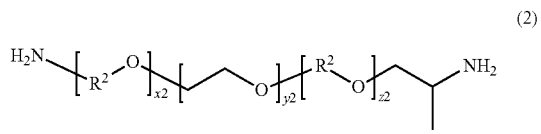

(2)

wherein (x2+z2) is from 1 to 60; y2 is from 1 to 50; and $R^2$ represents a propylene group; and wherein the proportion of the constituent unit derived from the xylylenediamine (a-2) in the diamine constituent unit is from 50 to 99.8% by mole.

16. The polyether polyamide composition according to claim 15, wherein the xylylenediamine (a-2) is m-xylylenediamine, p-xylylenediamine, or a mixture thereof.

17. The polyether polyamide composition according to claim 15, wherein the xylylenediamine (a-2) is m-xylylenediamine.

18. The polyether polyamide composition according to claim 15, wherein the xylylenediamine (a-2) is a mixture of m-xylylenediamine and p-xylylenediamine.

19. The polyether polyamide composition according to claim 18, wherein the proportion of the p-xylylenediamine relative to a total amount of m-xylylenediamine and p-xylylenediamine is 90% by mole or less.

20. The polyether polyamide composition according to claim 15, wherein the α, ω-linear aliphatic dicarboxylic acid having from 4 to 20 carbon atoms is at least one member selected from adipic acid and sebacic acid.

21. The polyether polyamide composition according to claim 15, wherein the molecular chain extender (B) is an aliphatic carbodiimide compound.

22. The polyether polyamide composition according to claim 15, wherein the molecular chain extender (B) is an epoxy group-containing (meth)acrylic polymer.

23. The polyether polyamide composition according to claim 15, wherein the relative viscosity of the polyether polyamide composition is from 1.1 to 3.5.

24. The polyether polyamide composition according to claim 15, wherein the melting point of the polyether polyamide composition is from 170 to 270° C.

25. The polyether polyamide composition according to claim 15, wherein a rate of tensile elongation at break at a measurement temperature of 23° C. and a humidity of 50% RH is 100% or more.

26. A method for producing the polyether polyamide composition according to claim 15, which comprises blending 100 parts by mass of the polyether polyamide (A2) with from 0.01 to 15 parts by mass of the molecular chain extender (B) and melt kneading the blend.

27. A molded article comprising the polyether polyamide composition according to claim 15.

28. The polyether polyamide composition according to claim 15, wherein the number average molecular weight of the polyether diamine compound (a2-1) is from 300 to 1,500.

* * * * *